US012526334B2

United States Patent
Xu et al.

(10) Patent No.: US 12,526,334 B2
(45) Date of Patent: Jan. 13, 2026

(54) DATA PROCESSING METHOD AND APPARATUS BASED ON EDGE COMPUTING, DEVICE, AND STORAGE MEDIUM

(71) Applicant: Tencent Technology (Shenzhen) Company Limited, Shenzhen (CN)

(72) Inventors: Shili Xu, Shenzhen (CN); Yabin Fu, Shenzhen (CN); Bingwu Zhong, Shenzhen (CN); Xiaohu Ma, Shenzhen (CN); Yulin Hu, Shenzhen (CN); Yanhui Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 209 days.

(21) Appl. No.: 18/241,139

(22) Filed: Aug. 31, 2023

(65) Prior Publication Data

US 2023/0412672 A1 Dec. 21, 2023

Related U.S. Application Data

(63) Continuation of application No. PCT/CN2022/106177, filed on Jul. 18, 2022.

(30) Foreign Application Priority Data

Jul. 28, 2021 (CN) .......................... 202110855560.5

(51) Int. Cl.
*H04L 67/1008* (2022.01)
*H04L 47/765* (2022.01)
*H04L 47/83* (2022.01)

(52) U.S. Cl.
CPC ........ *H04L 67/1008* (2013.01); *H04L 47/765* (2013.01); *H04L 47/83* (2022.05)

(58) Field of Classification Search
CPC ........ A63F 13/35–358; A63F 2300/531; A63F 2300/534; A63F 2300/535; H04L 67/1008;
(Continued)

(56) References Cited

U.S. PATENT DOCUMENTS 11,573,836 B2 * 2/2023 Wang ...................... H04W 4/48
11,824,794 B1 * 11/2023 Childress .............. H04L 47/822
(Continued)

FOREIGN PATENT DOCUMENTS

CN 105451838 A 3/2016
CN 111666140 A 9/2020
(Continued)

OTHER PUBLICATIONS

Tencent Technology, ISR, PCT/CN2022/106177, Sep. 26, 2022, 3 pgs.

(Continued)

*Primary Examiner* — Jerry B Dennison
(74) *Attorney, Agent, or Firm* — Morgan, Lewis & Bockius LLP

(57) ABSTRACT

A method for allocating edge computing resources is performed by a computer device, the method including: obtaining computing power resource information occupied by a target application at an edge computing node and a current operating frequency of the edge computing node during operation of the target application; determining expected demand computing power resource information of the target application for the edge computing node within a target time period according to a number of newly added service objects, offline service objects, and scenario switching service objects during the target time period; and determining a target operating frequency of the edge computing node within the target time period according to the current oper- (Continued)

ating frequency, the occupied computing power resource information, and the expected demand computing power resource information.

19 Claims, 9 Drawing Sheets

(58) Field of Classification Search
CPC ..... H04L 47/765; H04L 47/83; G06F 1/3206; G06F 2209/5019; G06F 2209/5022; G06F 2209/503; G06F 2209/508; G06F 1/324; G06F 9/505; G06F 9/5072; G06F 9/5094; Y02D 10/00
See application file for complete search history.

(56) References Cited

U.S. PATENT DOCUMENTS

| | | | |
|---|---|---|---|
| 2013/0274020 A1* | 10/2013 | Novotny | A63F 13/792 463/42 |
| 2013/0290751 A1 | 10/2013 | Mondal et al. | |
| 2014/0309039 A1 | 10/2014 | Yoshida et al. | |
| 2014/0342819 A1* | 11/2014 | Bruno, Jr. | A63F 13/35 463/29 |
| 2023/0379267 A1* | 11/2023 | Childress | H04L 47/781 |
| 2023/0412672 A1* | 12/2023 | Xu | H04L 47/765 |
| 2025/0141816 A1* | 5/2025 | Nakfour | H04L 47/808 |

FOREIGN PATENT DOCUMENTS

| | | |
|---|---|---|
| CN | 112494935 A | 3/2021 |
| CN | 112799789 A | 5/2021 |
| CN | 113599803 A | 11/2021 |

OTHER PUBLICATIONS

Tencent Technology, Extended European Search Report, EP Patent Application No. 22848307.9, Oct. 25, 2024, 14 pgs.

Bhojan Anand et al., "ARIVU: Power-Aware Middleware for Multiplayer Mobile Games", IEEE, 9th Annual Workshop on Network and Systems Support for Games, DOI: 10.1109/NETGAMES. 2010.5679571, Nov. 2010, 6 pgs.

Bren C. Mochocki et al., "Signature-Based Workload Estimation for Mobile 3D Graphics", Proceedings of the 43rd annual Design Automation Conference (DAC), DOI: 10.1145/1146909.1147062, Jul. 2006, 6 pgs.

Tencent Technology, WO, PCT/CN2022/106177, Sep. 26, 2022, 6 pgs.

Tencent Technology, IPRP, PCT/CN2022/106177, Jan. 18, 2024, 7 pgs.

* cited by examiner

DATA PROCESSING METHOD AND APPARATUS BASED ON EDGE COMPUTING, DEVICE, AND STORAGE MEDIUM

CROSS-REFERENCE TO RELATED APPLICATIONS

This application is a continuation application of PCT Patent Application No. PCT/CN2022/106177, entitled "DATA PROCESSING METHOD AND APPARATUS BASED ON EDGE COMPUTING, DEVICE, AND STORAGE MEDIUM" filed on Jul. 18, 2022, which claims priority to Chinese Patent Application 202110855560.5, entitled "DATA PROCESSING METHOD BASED ON EDGE COMPUTING, DEVICE, AND READABLE STORAGE MEDIUM" filed to the Chinese Patent Office on Jul. 28, 2021, which is incorporated herein by reference in its entirety.

FIELD OF THE TECHNOLOGY

This application relates to the field of computer technologies, and in particular to a data processing method and apparatus based on edge computing, a computer device, and a computer-readable storage medium.

BACKGROUND OF THE DISCLOSURE

Cloud gaming is a process of running games on remote servers, and compressing and encoding rendered game pictures and then sending same to terminals through a network in an audio and video stream manner. Cloud gaming does not need to consider terminal configurations, thereby thoroughly solving the technical problem that terminals cannot run large games due to insufficient performance. However, cloud gaming has very high requirements on network delay. In order to provide a more stable network condition for objects, edge computing nodes may generally be deployed on a large scale, so that cloud gaming servers are closer to the objects.

In order to provide a better experience for the objects, operating frequencies of the edge computing nodes are generally set according to the largest quantity of online game objects, and the provided computing power is prepared for the largest quantity of the online game objects. However, the quantity of the online game objects has a relatively obvious tide phenomenon. In an off-peak period, the actual quantity of the online game objects is much less than the largest online quantity. In this case, the operating frequencies of the edge computing nodes are excessively large in terms of the actual online quantity. The large power consumption of the edge computing nodes causes waste of operation costs of the edge computing nodes and shortening of the service life, and the operation costs are greatly increased.

SUMMARY

A method for allocating edge computing resources performed by a computer device is provided and the method includes:
obtaining computing power resource information occupied by a target application at an edge computing node and a current operating frequency of the edge computing node during operation of the target application;
determining expected demand computing power resource information of the target application for the edge computing node within a target time period according to a number of newly added service objects, offline service objects, and scenario switching service objects during the target time period; and
determining a target operating frequency of the edge computing node within the target time period according to the current operating frequency, the occupied computing power resource information, and the expected demand computing power resource information.

A computer device includes: a processor, a memory, and a network interface, the processor being connected to the memory and the network interface, the memory storing computer-readable instructions, and the computer-readable instructions, when executed by the processor, causing the computer device to implement the method according to embodiments of this application.

A non-transitory computer-readable storage medium, stores computer-readable instructions, and the computer-readable instructions, when executed by a processor of a computer device, causing the computer device to implement the method according to embodiments of this application.

BRIEF DESCRIPTION OF THE DRAWINGS

To describe the technical solutions in the embodiments of the present disclosure or the related art more clearly, the accompanying drawings required for describing the embodiments or the related art are briefly described below. Apparently, the accompanying drawings in the following description show some embodiments of the present disclosure, and a person skilled in the art may still derive other drawings from these accompanying drawings without creative efforts.

DESCRIPTION OF EMBODIMENTS

Figure 1:
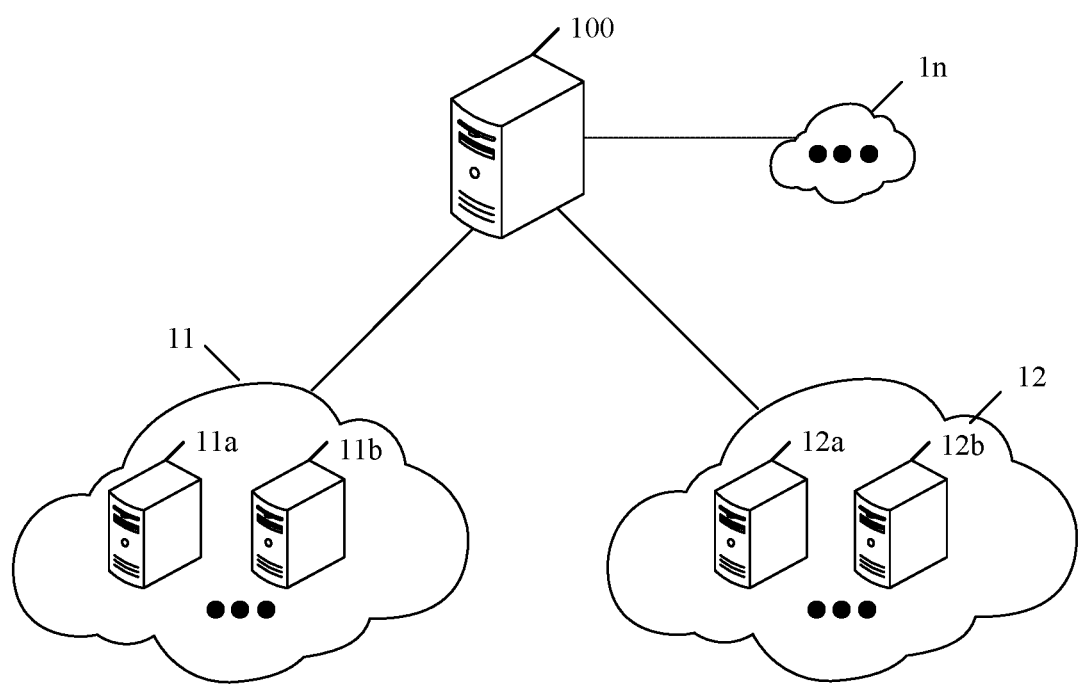
FIG. 1 is a schematic diagram of a network architecture provided according to an embodiment of this application.

The technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without making creative efforts shall fall within the protection scope of this application.

This application relates to technologies such as cloud computing, cloud gaming and edge computing. Related concepts of cloud computing, cloud gaming and edge computing are first described below.

Cloud computing refers to a delivery and use mode of an IT infrastructure, which refers to obtaining required resources in an on-demand and easy-to-expand manner through a network. Broadly, cloud computing refers to a delivery and use mode of services, which refers to obtaining required services in an on-demand and easy-to-expand manner through a network. Such services may be related to IT, software, and the Internet, or other services. Cloud computing is a product developed and fused by conventional computer and network technologies such as grid computing, distributed computing, parallel computing, utility computing, network storage technologies, virtualization, and load balance.

With the diversified development of the Internet, real-time data streams and connection devices, and under the promotion of demands such as search services, social networks, mobile commerce and open collaboration, cloud computing rapidly develops. Unlike conventional parallel distributed computing, the emergence of cloud computing will promote a revolutionary change of the whole Internet mode and enterprise management mode from the concept.

Cloud gaming, which may also be referred to as gaming on demand, is an online gaming technology based on the cloud computing technology. The cloud gaming technology enables a thin client with relatively limited graphics processing and data computing capabilities to run a high-quality game. In a cloud gaming scenario, the game does not run in a terminal of a game player, but runs in a cloud server, and the cloud server renders a game scenario as a video/audio stream and transmits same to the terminal of the game player through a network. The terminal of the game player does not need to have a powerful graphics operation and data processing capability, and only needs to have basic streaming media playing capability and the capability of obtaining a player input instruction and sending same to the cloud server.

Edge computing refers to an open platform integrating network, computing, storage and application core capabilities on one side close to an object or a data source, and provides a nearest-end service nearby. Application programs of edge computing are initiated at the edge side, a faster network service response is generated, and basic requirements in real-time services, application intelligence, security, privacy protection, and the like are satisfied.

A cloud gaming edge computing node is a node for edge computing, and is generally composed of a plurality of servers having a graphics processing unit (GPU) computing capability. A single server may be referred to as a computing node.

Computing power, as its name suggests, is the computing capability of devices such as small devices including mobile phones and computers, and large devices such as super computers. The computing power exists in various hardware devices. Computing power resources are hardware or network resources that need to be occupied when a device executes a computing task, and may generally include a central processing unit (CPU) computing power resource, a GPU computing power resource, a memory resource, a network bandwidth resource, and a disk resource.

The solutions provided in the embodiments of this application relate to cloud computing and cloud gaming technologies in the field of cloud technologies, and the specific processes are described in the following embodiments.

FIG. 1 is a schematic diagram of a network architecture provided according to an embodiment of this application. As shown in FIG. 1, the network architecture may include a management server 100 and an edge node 11, an edge node 12, . . . , and an edge node 1n. The edge node 11 may include a plurality of computing servers such as a computing server 11a and a computing server 11b, and the edge node 12 may include a plurality of computing servers such as a computing server 12a and a computing server 12b. As shown in FIG. 1, the computing servers such as the computing server 11a and the computing server 11b in the edge node 11 may communicate with each other, and the computing servers such as the computing server 12a and the computing server 12b in the edge node 12 may communicate with each other. Any computing server in the edge node 11, any computing server in the edge node 12, . . . , and any computing server in the edge node In may respectively establish a network connection with the management server 100, so that each computing server may perform data interaction with the management server 100 through the network connection, and each computing server may receive management data from the management server 100. It may be understood that the computing servers in an edge node are generally deployed in a same region, and different edge nodes are generally deployed in different regions.

As shown in FIG. 1, the computing servers in the edge nodes may correspond to a terminal device cluster, and a target application may be integrally installed on each terminal device in the terminal device cluster. When the target application runs in each terminal device, the target application may perform data interaction with a computing server allocated by the management server 100 to the target application. The target application may include one or more applications of a game application, a video editing application, a social application, an instant messaging application, a live streaming application, a short video application, a video application, a music application, a shopping application, a novel application, a payment application, a browser, and the like which have data information functions such as text, image, audio, and video. A computing server provides a corresponding function service for a target application operating in a terminal device, but consumes corresponding computing power resources at the same time. The computing power resources of a computing server may correspond to different terminal devices at the same time. When a target application (e.g., a cloud gaming application) operates in the terminal device accessing the computing server, the target application will occupy the computing power resources of the computing server. Each computing server may also be referred to as an edge computing node.

In order to enable an object using a target application to smoothly operate the target application, the computing server generally prepares computing power resources for the target application according to the largest online quantity (the quantity of objects logging into the target application) of the target application (setting an operating frequency according to the largest online quantity, and preparing computing power resources according to the operating frequency). The operating frequency may refer to a frequency of an operation module such as a CPU and a GPU in the computing server during operation. For example, generally, the largest online quantity of the target application is 500, then the operating frequency set by the computing server for the target application is a frequency capable of providing function services for 500 objects, and prepared computing power resources are computing power resources corresponding to the operating frequency. If the quantity of online objects of the target application is much less than the largest online quantity 500 within a time period, the operating frequency of the computing server is excessively large (which is the operating frequency corresponding to the largest online quantity 500), and actually, a relatively small operating frequency is required, thereby causing waste of the computing power resources of the computing server, and also causing excessive power consumption of the computing server. Similarly, if the quantity of online objects of the target application is much more than the largest online quantity 500 within a time period, function services that can be provided by the operating frequency of the computing server cannot support the operating of the target application, so that requirements of the target application cannot be satisfied.

In order to enable the computing server to better satisfy the requirements of the target application for computing power resources while reducing the power consumption, the management server 100 performs data interaction with each computing server to obtain a current operating frequency of each computing server, so as to obtain computing power total resource information (i.e., the maximum computing power resource information) corresponding to the current operating frequency. The management server 100 may also obtain occupied computing power resource information of the computing server (i.e., computing power resources of the computing server occupied by the target application during operation, for example, CPU computing power resources of the computing server occupied by the target application during operation), and predict expected demand computing power resource information of the target application for the computing server within a target time period (i.e., computing power resources of the computing server that are predicted to be occupied by the target application within the target time period, for example, CPU computing power resources of the computing server that are predicted to be occupied by the target application during operation within the target time period). Subsequently, the management server 100 may determine a target operating frequency (the target operating frequency may refer to a predicted operating frequency of the computing server within the target time period, the target operating frequency may be obtained after the current operating frequency is increased or reduced, and the target operating frequency may also be equal to the current operating frequency) of the computing server within the target time period according to the expected demand computing power resource information, the occupied computing power resource information, and the maximum computing power resource information corresponding to the current operating frequency (the current operating frequency may refer to a frequency of an operation module such as a CPU and a GPU in the computing server during current operating; and when the occupied computing power resource information and the expected demand computing power resource information refer to CPU computing power resources, the current operating frequency may refer to a frequency of the CPU in the computing server during the current operating). The maximum computing power resource information corresponding to the target operating frequency satisfies the expected demand computing power resource information. That is to say, the operating frequency of the computing server may be dynamically adjusted, so that the maximum computing power resource information corresponding to the target operating frequency of the computing server within the target time period may satisfy the expected demand computing power resource information, thereby reducing a situation in which power consumption is excessively large or computing power resource requirements cannot be satisfied due to the fact that the operating frequency of the computing server within the target time period is excessively large or small.

For ease of understanding, description is made by taking an example in which the management server 100 determines the target operating frequency of the computing server 11a within the target time period. As shown in FIG. 1, the management server 100 obtains occupied computing power resource information (i.e., computing power resource information of the computing server 11a occupied during operation of the target application) of the target application for the computing server 11a. The occupied computing power resource information may refer to quantitative index information of computing power resources occupied when the computing server 11a provides a function service for the target application. The quantitative index information may include one or more of a plurality of pieces of index information such as central processing unit (CPU) computing power information, graphics processing unit (GPU) computing power information, memory usage information, network bandwidth usage information, and disk read-write capability information. By taking an example in which the quantitative index information includes the CPU computing power and the GPU computing power, the occupied computing power resource information is calculating: the values of the CPU computing power and the GPU computing power of the computing server 11a occupied during operation of the target application.

Subsequently, the management server 100 may predict expected demand computing power resource information (i.e., computing power resource information of the computing server 11a that is predicted to be occupied when the target application operates within the target time period) of the target application for the computing server 11a within the target time period. The management server 100 may obtain a current operating frequency of the computing server 11a. The management server 100 may determine a target operating frequency of the computing server 11a within the target time period according to the maximum computing power resource information corresponding to the current operating frequency, the occupied computing power resource information, and the expected demand computing power resource information. The maximum computing power resource information corresponding to the target operating frequency satisfies the expected demand computing power resource information. Then, in the target time period, the operating frequency of the computing server 11a may be adjusted from the current operating frequency to the target operating frequency, so that computing power resources provided by the computing server 11a for the target application within the target time period are not excessively large or small. For specific implementation manners of predicting expected demand computing power resource information of the target application for the computing server 11a within the target time period, and determining the target operating frequency within the target time period, please refer to the description in the embodiment corresponding to subsequent FIG. 3.

It may be understood that the foregoing processing process may be performed by the management server separately, or may be separately executed by the computing server, or may be executed by the management server and the computing server, and the specific implementation may be adjusted according to actual requirements, which is not limited herein.

It may be understood that the method provided according to the embodiments of this application may be executed by a computer device, and the computer device includes, but is not limited to, a terminal device, a computing server, or a management server. The management server may be an independent physical server or a server cluster composed of a plurality of physical servers or a distributed system, or may be a cloud server that provides basic cloud computing services such as cloud services, cloud databases, cloud computing, cloud functions, cloud storage, network services, cloud communications, middleware services, domain name services, security services, CDN, and big data and artificial intelligence platforms.

The terminal device in the terminal device cluster may include a mobile phone, a tablet computer, a notebook computer, a handheld computer, a smart speaker, a mobile Internet device (MID), a point of sales (POS) machine, a wearable device (such as a smart watch and a smart wristband), a vehicle-mounted device, and the like.

Figure 2A:
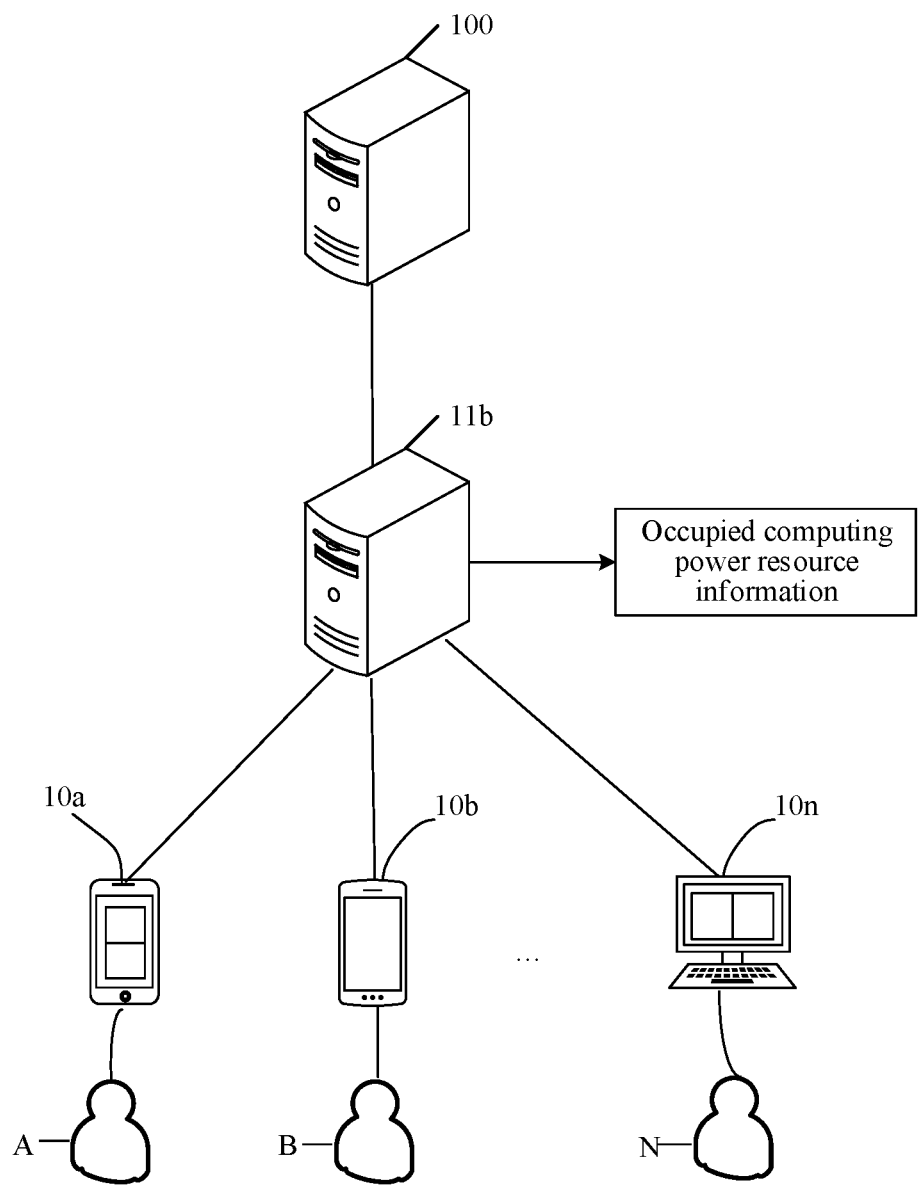
FIG. 2A and FIG. 2B are scenario diagrams of predicting a target operating frequency within a target time period provided according to embodiments of this application.
Figure 2B:
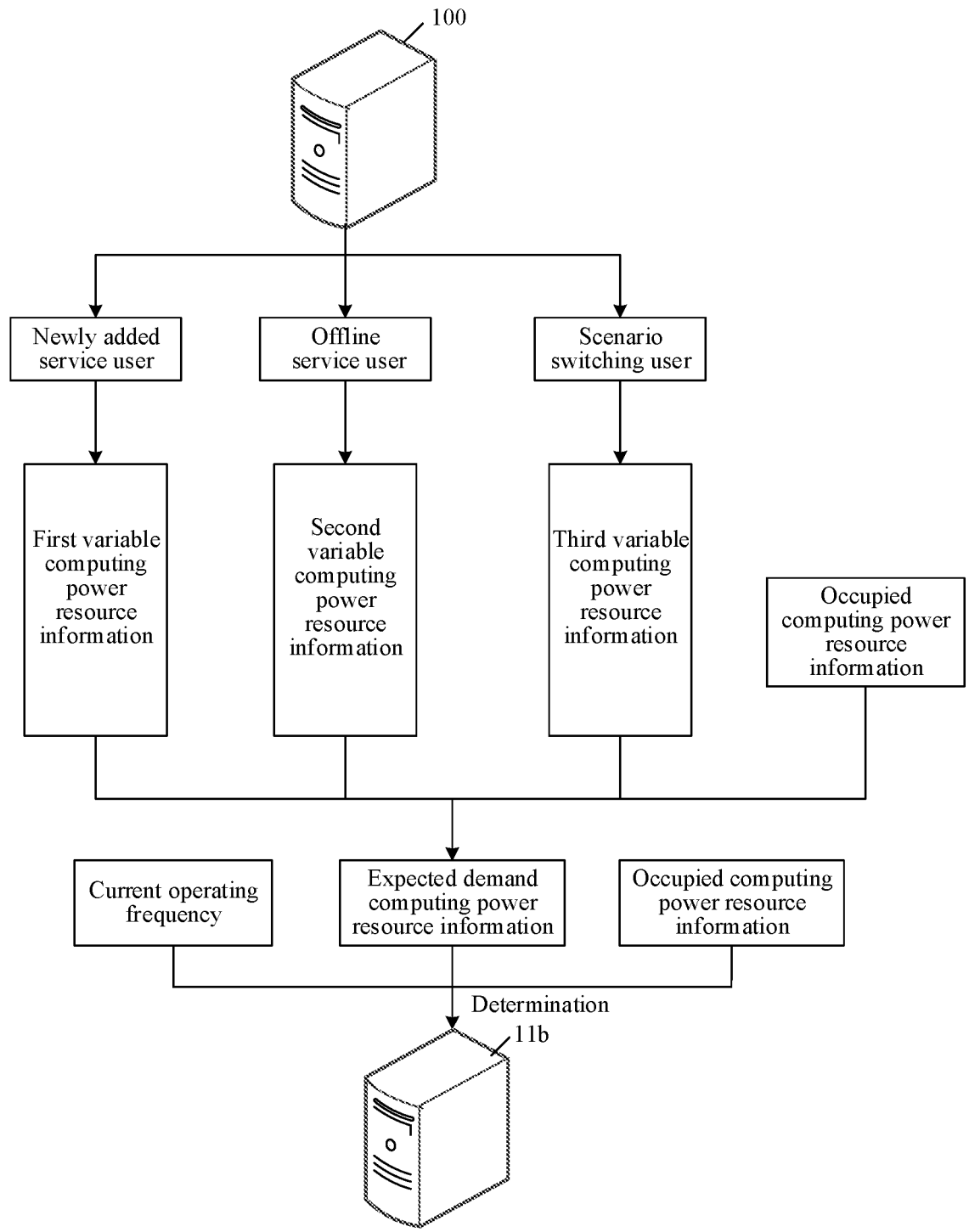

For ease of understanding, please refer to FIG. 2A and FIG. 2B. FIG. 2A and FIG. 2B are scenario diagrams of predicting a target operating frequency within a target time period provided according to embodiments of this application. The scenario shown in FIG. 2A gives an example in which the target application is a cloud gaming application of a multi-player competition game. A service object A may operate the cloud gaming application through a corresponding terminal device 10a, a service object B may operate the cloud gaming application through a corresponding terminal device 10b, . . . , and a service object N may operate the cloud gaming application through a corresponding terminal device 10n. The computing server 11b provides service support for the cloud gaming application in the terminal device 10a, the terminal device 10b, . . . , and the terminal device 10n. The computing server 11b may also be referred to as a cloud game server or an edge computing node.

It may be understood that the cloud gaming application may include different application activity scenarios, and service objects (such as a service object A, a service object B, . . . , and a service object N; the service object may refer to a binding account of a service user using the terminal device to operate the cloud gaming application in the cloud gaming application; the service user may use the binding account to log into the cloud gaming application; and the cloud gaming application may also determine, through the binding account, whether the service user has logged in) logged into the cloud gaming application may enter the different application activity scenarios, and perform games in the different application activity scenarios. The computing power resources required by the different application activity scenarios are generally different.

The application activity scenario may refer to a scenario type to which a picture displayed on the terminal device belongs when the cloud gaming application operates on the terminal device. An application activity scenario may provide a corresponding application function for the cloud gaming application. For example, the application activity scenario may include a game home lobby scenario (i.e., when a service user logs in or opens a cloud gaming application, the cloud gaming application generally presents a default picture which can be used for game character presentation, character costume change, competition mode selection, and the like; and the default presentation picture is generally referred to as a game home lobby), a single-player competition scenario (i.e., a single-player mode in the cloud gaming application; the single-player competition scenario is used for single-player parachuting, single-player breakthrough, and the like), a multi-player competition scenario (i.e., a multi-player competition mode in the cloud gaming application; the multi-player competition scenario may be used for multi-player team-forming to fight monster to increase the game level, multi-player team-forming breakthrough, and the like.), and the like. Generally, in the game home lobby scenario, simple pictures and controls such as a game background, game character introduction of a service object, and game competition mode selection need to be presented to the service object, and the game home lobby scenario requires small computing power resources (the computing server 11b may operate at a small frequency). In the single-player competition scenario, the service object may perform a single-player competition game (e.g., a single player operates the game character to increase game experience or obtain a game gold coin and the like). Compared with the game home lobby scenario, in the single-player competition scenario, there are more operation instructions for the service object, which requires more calculation, and then the single-player competition scenario requires more computing power resources (the computing server 11b needs to operate at a larger frequency). In the multi-player competition scenario, the service objects may perform a large number of game operations (such as sliding a steering wheel rim, releasing skills of a game character, and clicking a retreat control). In addition, voice communication, text communication, and the like may also be performed between the service objects. That is to say, generally, the multi-player competition scenario needs to satisfy game operation instructions of the service objects, and also needs to provide computing services for communication to the service objects. Compared with the single-player competition game, the multi-player competition scenario requires more computing power resources (the computing server 11b needs to operate at a larger frequency).

As shown in FIG. 2A, by taking an example in which the service object A, the service object B, . . . , and the service object N include a service object 1, a service object 2, a service object 3, . . . , and a service object 10, the service object 1, the service object 2, the service object 3, . . . , and the service object 10 are all in an online state. The service object 1, the service object 2, the service object 3, . . . , and the service object 10 may be referred as current online service objects. The management server 100 may obtain an application activity scenario where each service object of the service object 1, the service object 2, the service object 3, . . . , and the service object 10 is located, and obtain computing power resources (hereinafter referred to as service object occupied resource information) occupied when each service object is located in the corresponding application activity scenario. By taking an example in which the application activity scenario where the service objects 1-5 are located is the game lobby scenario, the application activity scenario where the service objects 6-8 are located is the single-player competition scenario, and the application activity scenario where the service objects 9-10 are located is the multi-player competition scenario, the service object occupied resource information corresponding to the service object 1 is 70, the service object occupied resource information corresponding to the service object 2 is 71, the service object occupied resource information corresponding to the service object 3 is 72, the service object occupied resource information corresponding to the service object 4 is 70, and the service object occupied resource information corresponding to the service object 5 is 73. In this case, the management server 100 may add the service object occupied resource information corresponding to the service objects 1-5, thereby obtaining the total occupied computing power resources 356 (i.e., 70+71+72+70+73) of the game home lobby scenario. In this embodiment, the unit of the service object occupied resource information is TOPS, GOPS, or MOPS. TOPS is an abbreviation for Tera operations per second, and 1 TOPS represents that a processor may perform trillion ($10^{12}$) operations per second. GOPS is an abbreviation for Giga operations per second, and 1 GOPS represents that a processor may perform billion ($10^9$) operations per second. MOPS is an abbreviation for million operation per second, and 1 MOPS represents that a processor may perform million ($10^6$) operations per second.

The service object occupied resource information corresponding to the service object 6 is 101, the service object occupied resource information corresponding to the service object 7 is 110, and the service object occupied resource information corresponding to the service object 8 is 108. In this case, the management server 100 may add the service object occupied resource information corresponding to the service objects 6-8, thereby obtaining the total occupied computing power resources 319 (i.e., 101+110+108) of the single-player competition scenario. If the service object occupied resource information corresponding to the service object 9 is 200, and the service object occupied resource information corresponding to the service object 10 is 208, the management server 100 may add the service object occupied resource information corresponding to the service objects 9-10, thereby obtaining the total occupied computing power resources 408 (i.e., 200+208) of the multi-player competition scenario. Further, the management server 100 may add the total occupied computing power resources respectively corresponding to the game home lobby scenario, the single-player competition scenario, and the multi-player competition scenario, thereby obtaining occupied computing power resource information 1083 of the computing server 11b.

Further, as shown in FIG. 2B, the management server 100 may predict a newly added service object (i.e., a binding account corresponding to a service user who logs into or opens the cloud gaming application within the target time period; the newly added service object do not belong to the current online service objects), an offline service object (i.e., a binding account corresponding to a service user in the current online service objects who exits from the cloud gaming application within the target time period), and a scenario switching service object (i.e., a binding account corresponding to a service user in the current online service objects who switches an application activity scenario within the target time period; the application activity scenario where these scenario switching service objects are currently located is different from the application activity scenario where the scenario switching service objects are located within the target time period, for example, the application activity scenario where the scenario switching service objects are currently located is the game home lobby scenario, but the application activity scenario where the scenario switching service objects are located within the target time period is the single-player competition scenario) for the cloud gaming application within the target time period. By taking an example in which the newly added service object within the target time period includes a service object 11 and a service object 12 (both the service object 11 and the service object 12 do not belong to the current online service objects 1-10), the offline service object includes the service object 7 and the service object 8 in the current online service objects 1-10, and the scenario switching service object includes the service object 9 in the current online service objects 1-10, generally, when the newly added service object starts to operate the cloud gaming application through the terminal device, a scenario displayed on the terminal device is generally the game home lobby scenario. That is to say, when the service object 11 and the service object 12 log into the cloud gaming application, an initial login scenario where the service object 11 and the service object 12 are located is the game home lobby scenario. In this case, first variable computing power resource information corresponding to the newly added service object may be determined according to the total occupied computing power resources (i.e., 356) corresponding to the game home lobby scenario, the service object 11, and the service object 12. The first variable computing power resource information is newly added demand computing power resource information corresponding to the service object 11 and the service object 12.

The specific method for determining the first variable computing power resource information includes: first, obtaining the total quantity (i.e., 5) of the service objects 1-5, and determining average computing power demand information (i.e., 356/5=71.2) of the game home lobby scenario according to the total occupied computing power resources (i.e., 356) corresponding to the game home lobby scenario and the total quantity (i.e., 5) of the objects, the average computing power demand information being average computing power resource information required by each of the service objects 1-5 in the game home lobby scenario; and then, obtaining the newly added quantity (i.e., 2) of the newly added service object (including the service object 11 and the service object 12), and multiplying the average computing power demand information 71.2 of the game home lobby scenario with the newly added quantity 2 to obtain the first variable computing power resource information 142.4.

It is to be understood that, the management server 100 may obtain application activity scenarios where the service object 7 and the service object 8 having an offline behavior are respectively located (it can be seen from the above that both the service object 7 and the service object 8 are located in the single-player competition scenario). After the service object 7 and the service object 8 are offline, the computing server 11b does not need to provide computing power resources thereto, and then the computing server 11b may release the corresponding computing power resources. In this case, the management server 100 may determine second variable computing power resource information corresponding to the offline service object, and the second variable computing power resource information is computing power resource information that is to be released and corresponds to the service object 7 and the service object 8.

The specific method for determining the second variable computing power resource information includes: first, obtaining the total quantity (i.e., 3) of the service objects 6-8, and determining average computing power demand information (i.e., 319/3=106.3) of the single-player competition scenario according to the total occupied computing power resources (i.e., 319) corresponding to the single-player competition scenario and the total quantity (i.e., 3) of the objects, the average computing power demand information being average computing power resource information required by each of the service objects 6-8 in the single-player competition scenario; and then, obtaining the offline quantity (i.e., 2) of the offline service object (including the service object 7 and the service object 8), and multiplying the average computing power demand information 106.3 of the single-player competition scenario with the offline quantity 2 to obtain the second variable computing power resource information 212.6.

It is to be understood that, the management server 100 may obtain an application activity scenario where the service object 9 having an scenario switching behavior is located (it can be seen from the above that the scenario where the service object 9 is located is the multi-player competition scenario), and an application activity scenario where the service object 9 is located after the scenario switching (e.g., the scenario where the service object 9 is located after the switching is the game home lobby scenario). Since different application activity scenarios require different computing power resources, after the service object 9 performs scenario switching, the computing power resources required by the service object 9 will also change. In this case, the management server 100 may determine third variable computing power resource information corresponding to the service object 9. The third variable computing power resource information is variable computing power resource information after scenario switching (the change computing power resource information may be a positive value or a negative value; when the variable computing power resource information is a positive value, it is indicated that the computing server 11*b* needs to newly add computing power resources after scenario switching; and when the variable computing power resource information is a negative value, it is indicated that the computing server 11*b* needs to release computing power resources after scenario switching).

The specific method for determining the third variable computing power resource information includes: first, obtaining the total quantity (i.e., 2) of the service objects 9-10, and determining average computing power demand information (i.e., 408/2=204) of the multi-player competition scenario according to the total occupied computing power resources (i.e., 408) corresponding to the multi-player competition scenario and the total quantity (i.e., 2) of the objects, the average computing power demand information being average computing power resource information required by each of the service objects 9-10 in the multi-player competition scenario; and then, obtaining the switching quantity (i.e., 1) of the scenario switching service object (including the service object 9), and multiplying the average computing power demand information 204 of the multi-player competition scenario with the switching quantity 1 to obtain computing power resources 204 that are to be released by the multi-player competition scenario. Then, it can be seen from the above that the average computing power demand information of the game home lobby scenario is 71.2. The management server 100 may multiply the average computing power demand information 71.2 of the game home lobby scenario with the switching quantity 1, thereby obtaining demand computing power resources 71.2 that are to be increased by the game home lobby scenario. It can be seen from the above that, since computing power resources that are to be released by the service object 9 after scenario switching are greater than computing power resources to be increased, the total variable computing power resource information (i.e., the third variable computing power resource information) corresponding to the service object 9 is −132.8 (i.e., 71.2−204).

Further, the management server 100 may add the determined occupied computing power resource information (1083), the first variable computing power resource information (i.e., 142.4), and the third variable computing power resource information (i.e., −132.8), and subtracts the second variable computing power resource information (i.e., 212.6) from the result obtained by addition (1092.6). The obtained result (i.e., 880) can be determined as expected demand computing power resource information required by the cloud gaming application for the computing server 11*b* within the target time period.

Further, the management server 100 may obtain a current operating frequency of the computing server 11*b*, and determine the current maximum computing power resource information of the computing server 11*b* according to the current operating frequency. The management server 100 may determine a target operating frequency of the computing server 11*b* within the target time period according to the maximum computing power resource information corresponding to the current operating frequency, the expected demand power resource information, and the occupied computing power resource information. The maximum computing power resource information corresponding to the target operating frequency satisfies the expected demand computing power resource information. For a specific implementation of determining the target operating frequency, please refer to the description in the embodiment corresponding to subsequence FIG. 4.

After the target operating frequency is determined, the operating frequency of the computing server 11*b* within the target time period may be adjusted from the current operating frequency to the target operating frequency. The operating frequency of the computing server is dynamically adjusted, so that the maximum computing power resource information corresponding to the target operating frequency of the computing server 11*b* within the target time period may satisfy the expected demand computing power resource information, thereby reducing a situation in which power consumption of the computing server 11*b* is excessively large or computing power resource requirements of the cloud gaming application cannot be satisfied due to the fact that the operating frequency of the computing server within the target time period is excessively large or small.

The numerical values of the computing power resources (e.g., 71, 70, 110, 108, etc.) are all illustrated for ease of understanding, and do not have practical reference significance.

Figure 3:
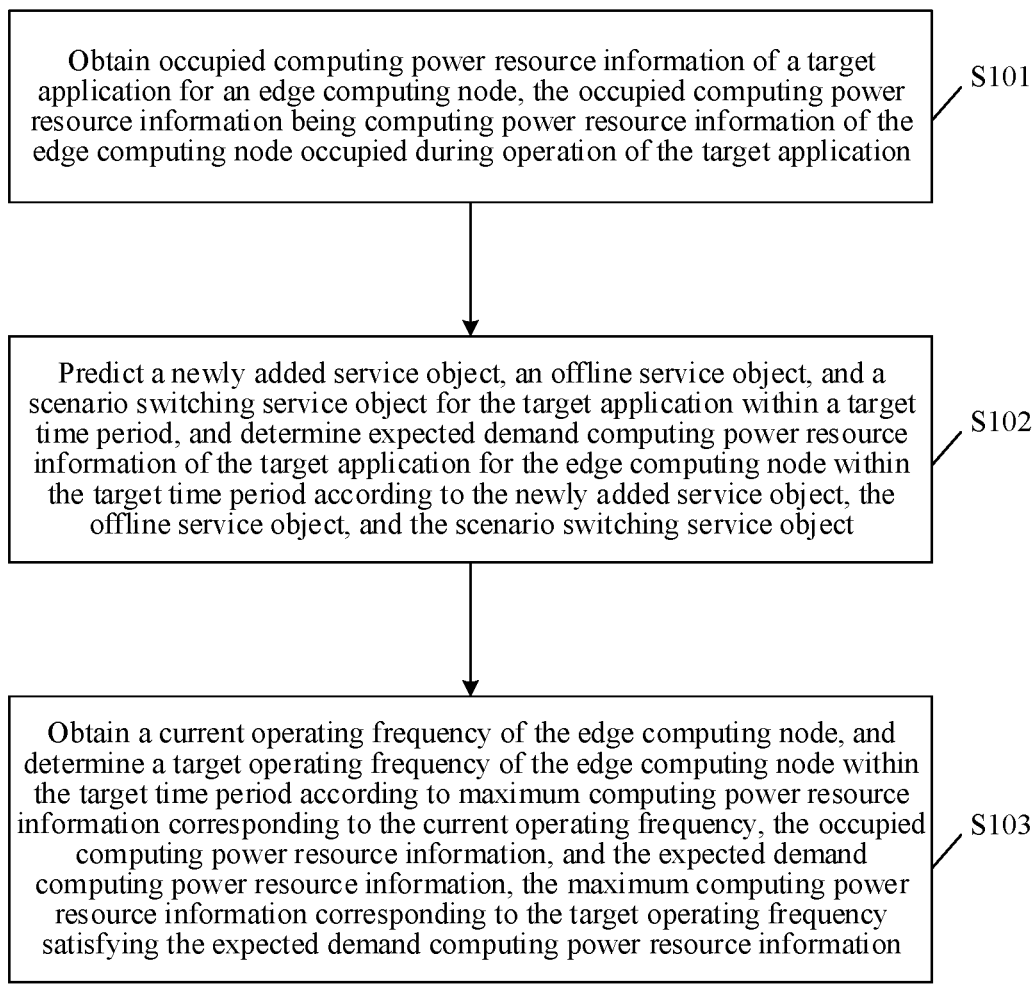
FIG. 3 is a schematic flowchart of a data processing method based on edge computing provided according to an embodiment of this application.

Further, FIG. 3 is a schematic flowchart of a data processing method based on edge computing provided according to an embodiment of this application. The method may be executed by the computer device in the embodiment corresponding to FIG. 1, that is, may be executed by the management server 100 in FIG. 1, or may be executed by a computing server (also including a computing server 11*a*, a computing server 11*b*, a computing server 12*a*, and a computing server 12*b*) in the edge node cluster in FIG. 1. As shown in FIG. 3, the data processing method based on edge computing may include the following steps S101 to S103:

Step S101: Obtain occupied computing power resource information of a target application for an edge computing node. The occupied computing power resource information is computing power resource information of the edge computing node occupied during operation of the target application.

In this application, the edge computing node may refer to a computer device capable of providing computing or application services, such as a server (e.g., the computing server 11*a*, the computing server 11*b*, the computing server 12*a*, or the computing server 12*b* shown in FIG. 1). The target application may refer to an application for which the edge computing node needs to complete a related computing task, for example, the target application may be a cloud gaming application. On the basis of the cloud computing technology, cloud gaming generally operates on a remote server, and a terminal device only needs to receive an audio/video stream sent by the remote server and then decodes and plays the audio/video stream. In this case, the remote server is an edge computing node.

It is to be understood that when the target application operates on the terminal device, the edge computing node may provide corresponding computing services for the target application, and when the edge computing node provides corresponding computing services for the target application, the target application occupies computing power resources of the edge computing node. The computing power may refer to the computing capability of the edge computing node. In this application, the measurement of the computing power of the edge computing node generally uses the CPU computing power and the GPU computing power. The CPU computing power is generally measured using operations per second (OPS). The GPU computing power has a plurality of measurement indexes according to the operation types, and is generally measured from the computing capability and data read throughput. The computing capability may be measured from floating-point operations per second (FLOPS), OPS, half-precision peak operation capability, and dual-precision peak operation capability according to the operation types. For computing power resources, certainly, other computing power resources, such as memory resources, network bandwidth resources, and disk resources, may also be included in addition to CPU computing power resources and GPU computing power resources. This application does not limit the content included in the computing power resources. Description is made below by taking an example in which the computing power resources include CPU computing power resources and GPU computing power resources.

Specifically, the target application may include one or more application activity scenarios. The application activity scenario may refer to a scenario type to which a picture displayed on the terminal device belongs when the target application operates on the terminal device. An application activity scenario may provide a corresponding application function for the target application. For example, when the target application is a social application, the application activity scenario may include a voice call scenario, a video call scenario, and a text chat scenario. After a service user logs in the social application through a binding account (referred to as a service object) of the social application, in a voice call scenario, the social application provides a voice communication function between different service objects (i.e., voice communication may be performed between the service users). In a video call scenario, the social application provides a video communication function between different service objects (i.e., video communication may be performed between the service users). In a text chat scenario, the social application provides a text communication function between different service objects (i.e., text communication may be performed between the service users). For example, when the target application is a cloud gaming application, the application activity scenario may include a game home lobby scenario, a single-player competition scenario, and a multi-player competition scenario. In the game home lobby scenario, the cloud gaming application provides functions of game background introduction, game character introduction, data display, competitive mode selection and the like for the service objects. In the single-player competition scenario, the cloud gaming application provides a single-player competition function for the service objects. In the multi-player competition scenario, the cloud gaming application provides a multi-player competition function, a multi-player communication function and the like for the service objects.

It may be understood that when the application activity scenarios of the service objects in the target application are different, required computing power resources are also generally different. Therefore, in this application, an application activity scenario of an online service object in a target application may be obtained, and computing power resources occupied by each online service object in the application activity scenario of the online service object may be obtained, so that the computing power resources of edge computing nodes occupied by all the online service objects may be obtained through statistics. The computing power resources of the edge computing nodes occupied by all the online service objects may be referred to as occupied computing power resource information. The specific method for determining occupied computing power resource information of the edge computing node includes: obtaining N pieces of current operating information of the target application, one piece of current operating information including an application activity scenario where an online service object is located, and service object occupied resource information in the application activity scenario; obtaining service object occupied resource information corresponding to each piece of current operating information, to obtain N pieces of service object occupied resource information; and determining a sum of the N pieces of service object occupied resource information as the occupied computing power resource information of the target application for the edge computing node.

It is to be understood that the service object occupied resource information may be understood as computing power resources of an edge computing node occupied when an online service object is in a certain application activity scenario. After each service user logs in the target application through the binding account (hereinafter referred to as a service object), a login state of the service object in the target application is an online state. In this case, the service object may also be referred to as an online service object. The computer device obtains an application activity scenario of each online service object in the target application in real time, and collects statistics about computing power resources occupied when the online service object is in a certain application activity scenario. One piece of current operating information may be formed by a current application activity scenario of an online service object and computing power resources occupied when the online service object is located in the application activity scenario. One piece of current operating information includes an application activity scenario where an online service object is located, and computing power resources occupied when the online service object is located in the application activity scenario. Therefore, N pieces of current operating information may include application activity scenarios where N online service objects are respectively located, and computing power resources respectively occupied when the N online service objects are located in the corresponding application activity scenarios. The total computing power resources (i.e., the occupied computing power resource information) of the edge computing nodes occupied by the N online service objects may be obtained by adding and summing the N pieces of service object occupied resource information (i.e., the computing power resources respectively occupied when the N online service objects are located in the corresponding application activity scenarios).

It is to be understood that the computing power resources include CPU computing power resources and GPU computing power resources. Therefore, when the occupied computing power resource information is subjected to statistics collection, CPU computing power resources and GPU computing power resources of the edge computing nodes occupied by the N online service objects may be subjected to statistics collection. The occupied CPU computing power resources and GPU computing power resources may be referred as occupied computing power resource information.

Step S102: Predict a newly added service object, an offline service object, and a scenario switching service object for the target application within a target time period, and determine expected demand computing power resource information of the target application for the edge computing node within the target time period according to the newly added service object, the offline service object, and the scenario switching service object.

In this application, the newly added service object may refer to a binding account (a service object) of a service user starting the target application in the target application within the target time period, and the edge computing node may provide a function service thereto. The offline service object may refer to a service object corresponding to the service user closing the target application within the target time period among the service users corresponding to the N online service objects. The scenario switching service object may refer to a service object who switches an application activity scenario within the target time period among the N online service objects (e.g., for a cloud gaming application, a certain online service object is in a single-player competition scenario at a current time point, and exits the single-player competition scenario and enters a game home lobby scenario within a target time period, and the online service object may be referred to as a scenario switching object). In this application, a newly added service object, an offline service object, and a scenario switching service object within a target time period may be predicted, and expected demand computing power resource information within the target time period is determined according to the newly added service object, the offline service object, and the scenario switching service object.

The specific method for predicting a newly added service object, an offline service object, and a scenario switching service object within a target time period includes: the computer device obtains historical service behavior data of the target application, and then obtains operational activity information of the target application within the target time period; a newly added service object of the edge computing node for the target application within the target time period is determined according to the operational activity information within the target time period and the historical service behavior data; and an offline service object and a scenario switching service object of the edge computing node for the target application within the target time period are determined according to the application activity scenario where the service object is located, the operational activity information within the target time period, and the historical service behavior data. The historical service behavior data may include related behavior data of a historical online service object, a historical online service object, a historical offline service object, and a historical scenario switching service object of each time node of the target application within a historical time period. The related behavior data may include an application activity scenario, an operation behavior, an application operating duration, etc.

It is to be understood that the operational activity information within the target time period may refer to special activities released in the target application within a time period such as a holiday (such as Labour Day, Double Seventh Day, and Dragon Boat Festival), a specific festival, and a version release date. For example, by taking an example in which a cloud gaming application is the target application, in the Dragon Boat Festival, a new Dragon Boat activity (such as a game character race activity) and a character costume time-limited purchase activity are released in the cloud gaming application. The service objects probably will, according to the operational activity information, select to log into the cloud gaming application within the target time period to participate in the Dragon Boat activity, and to purchase character costumes. The service objects who do not log into the cloud gaming application (i.e., do not belong to N online service objects) when the occupied computing power resource information is subjected to statistics collection, but are predicted to log into the cloud gaming application within the target time period may be referred to as newly added service objects. Moreover, the computer device may predict, from the N online service objects according to the operational activity information and the historical service behavior data, service objects who will stop operating the target application within the target time period. The service objects may be referred to as offline service objects. The computer device may also predict, from the N online service objects according to the operational activity information and the historical service behavior data, service objects who will switch a scenario. The service objects may be referred to as scenario switching service objects.

In some embodiments, when the computer device predicts an offline service user of the edge computing node for the target application within the target time period, the computer device may generate, according to an offline prediction model, an application activity scenario where the service user is located, operational activity information corresponding to the target application, and an offline behavior feature when the service user has an offline behavior, then outputs a predicted offline label corresponding to the offline behavior feature in the offline prediction model, and then determines the offline service user according to the predicted offline label. The offline prediction model is a machine learning model obtained by training according to the historical service behavior data, and is used for simulating offline behaviors of the service user within different time periods, and speculating that the user will be offline in what kind of behavior state such as in what kind of activity scenario and what kind of time node. Correspondingly, the computer device may also predict a scenario switching service user by using a corresponding machine learning model.

Further, expected demand computing power resource information of the target application for the edge computing node within the target time period may be determined according to the newly added service object, the offline service object, and the scenario switching service object. By taking an example in which the N pieces of current operating information include one or more application activity scenarios, and the one or more application activity scenarios include an application activity scenario $M_i$ (i is a positive integer), the specific method for determining the expected demand computing power resource information is described. The specific method may include: determining, from N online service objects, an online service object, of which an application activity scenario is an application activity scenario $M_i$, as a service object to be subjected to statistics collection; then, collecting statistics about total service object occupied resource information of the service object to be subjected to statistics collection in the application activity scenario $M_i$; then, obtaining an object quantity corresponding to the service object to be subjected to statistics collection, and determining, according to the total service object occupied resource information and the object quantity, average computing power demand information corresponding to the application activity scenario $M_i$; and in response to determining average computing power demand information respectively corresponding to the one or more application activity scenarios, determining expected demand computing power resource information of the target application for the edge computing node within the target time period according to the average computing power demand information respectively corresponding to the one or more application activity scenarios, the newly added service object, the offline service object, and the scenario switching service object.

The specific method for determining expected demand computing power resource information of the target application for the edge computing node within the target time period according to the average computing power demand information respectively corresponding to the one or more application activity scenarios, the newly added service object, the offline service object, and the scenario switching service object includes: obtaining a newly added quantity corresponding to the newly added service object, an offline quantity corresponding to the offline service object, and a switching quantity corresponding to the scenario switching object; predicting an initial login scenario corresponding to the newly added service object; the one or more application activity scenarios including the initial login scenario; then, determining an application activity scenario where the offline service object having an offline behavior is located as an offline application activity scenario; then, determining an application activity scenario where the scenario switching object is located before scenario switching as an initial application activity scenario, and determining an application activity scenario where the scenario switching object is located after scenario switching as a target application activity scenario; and determining expected demand computing power resource information of the target application for the edge computing node within the target time period according to the average computing power demand information respectively corresponding to the initial login scenario, the offline application activity scenario, the initial application activity scenario, and the target application activity scenario, as well as the switching quantity, the offline quantity, and the newly added quantity.

The specific method for determining expected demand computing power resource information of the target application for the edge computing node within the target time period according to the average computing power demand information respectively corresponding to the initial login scenario, the offline application activity scenario, the initial application activity scenario, and the target application activity scenario, as well as the switching quantity, the offline quantity, and the newly added quantity includes: determining, according to newly added quantity and the average computing power demand information corresponding to the initial login scenario, first variable computing power resource information corresponding to the newly added service object; determining second variable computing power resource information corresponding to the offline service object according to the offline quantity and the average computing power demand information corresponding to the online application activity scenario; determining third variable computing power resource information corresponding to the scenario switching object according to the average computing power demand information corresponding to the initial application activity scenario, the average computing power demand information corresponding to the target application activity scenario, and the switching quantity; and determining expected demand computing power resource information of the target application for the edge computing node within the target time period according to the first variable computing power resource information, the second variable computing power resource information, the third variable computing power resource information, and the occupied computing power resource information of the edge computing node.

It is to be understood that when a service object logs in or opens a target application, the service object generally enters a default interface, and a scenario corresponding to the default interface may be referred to as an initial login scenario. The one or more application activity scenarios included in the target application scenarios include the initial login scenario. For example, when a service object logs in a cloud gaming application, the service object generally enters a game home lobby scenario, and the game home lobby scenario may be referred to as an initial login scenario. The computer device may obtain average computing power demand information corresponding to the initial login scenario (i.e., in the initial login scenario, average computing power resources required by each online service object), and determine newly added computing power resource information corresponding to the newly added service object (e.g., a product result of the newly added quantity and the average computing power demand information corresponding to the initial login scenario) according to the newly added quantity of the newly added service object and the average computing power demand information corresponding to the initial login scenario (e.g., multiplying the newly added quantity with the average computing power demand information corresponding to the initial login scenario). The newly added computing power resource information may be computing power resources that need to be added when the edge computing node needs to provide a function service for the newly added service object. The newly added computing power resource information may be referred as first variable computing power resource information.

It is to be understood that the computer device may also obtain an application activity scenario (hereinafter referred as an offline application activity scenario) where the offline service object having an offline behavior (e.g., a behavior of exiting or closing the target application) is located, and determine released computing power resource information corresponding to the offline service object according to the average computing power demand information corresponding to the offline application activity scenario (i.e., in the offline application activity scenario, average computing power resources required by each online service object), and the offline quantity corresponding to the offline service object. That is to say, when the offline service users close the target application, the edge computing node does not need to provide function services for the offline service users, and the corresponding computing power resources may be released. These released computing power resources may be referred as second variable computing power resource information. The second variable computing power resource information may be a product of the offline quantity and the average computing power demand information corresponding to the offline application activity scenario.

It is to be understood that since different application activity scenarios require different computing power resources, after the service object performs scenario switching, the required computing power resources will also change (may increase or increase). Therefore, the computer device may predict service objects who will perform scenario switching within the target time period among the N online service objects, and predict application activity scenarios (referred as initial application activity scenarios) where the scenario switching objects are located before scenario switching, and application activity scenarios (referred as target application activity scenarios) where the scenario switching objects are located after scenario switching. For the initial application activity scenarios, the edge computing node may stop providing corresponding computing power resources for the scenario switching users, and the corresponding computing power resources are released. For the target application activity scenarios, the edge computing node needs to provide corresponding computing power resources, and computing power resources are newly added. Therefore, the average computing power demand information corresponding to the initial application activity scenario (in the initial application activity scenario, average computing power resources required by each online service object), and the average computing power demand information corresponding to the target application activity scenario may be obtained. A product of the average computing power demand information corresponding to the initial application activity scenario and the switching quantity of the scenario switching user is determined as computing power resources to be released corresponding to the initial application activity scenario. A product of the average computing power demand information corresponding to the target application activity scenario (in the target application activity scenario, average computing power resources required by each online service object) and the switching quantity of the scenario switching user is determined as computing power resources to be newly added corresponding to the target application activity scenario. A result obtained by adding the computing power resources to be released corresponding to the initial application activity scenario and the computing power resources to be newly added corresponding to the target application activity scenario serves as third variable computing power resource information (possibly a positive value or a negative value) corresponding to the scenario switching user.

Further, the occupied computing power resource information and the newly added computing power resources are added, and the computing power resources to be released are subtracted from the result obtained by addition, so as to obtain final expected computing power resource information. That is, the occupied computing power resource information, the first variable computing power resource information, and the third variable computing power resource information are added, and the second variable computing power resource information is subtracted from the result obtained by addition, so as to obtain expected demand computing power resource information of the target application for the edge computing node within the target time period.

Step S103: Obtain a current operating frequency of the edge computing node, and determine a target operating frequency of the edge computing node within the target time period according to maximum computing power resource information corresponding to the current operating frequency, the occupied computing power resource information, and the expected demand computing power resource information. The maximum computing power resource information corresponding to target operating frequency satisfies the expected demand computing power resource information.

Figure 4:
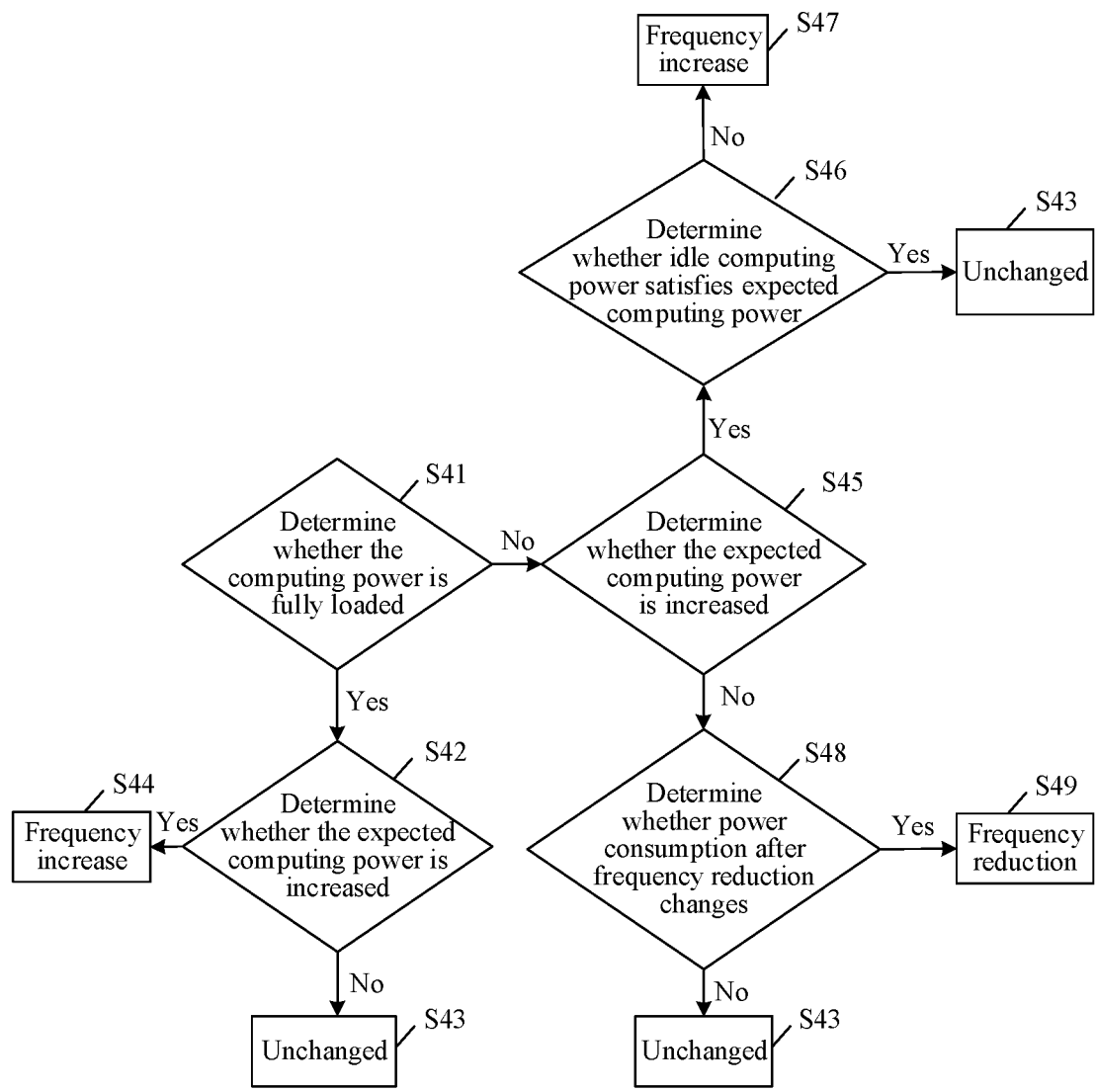
FIG. 4 is a logic flowchart of adjusting an operating frequency of an edge computing node provided according to an embodiment of this application.

In this application, the computer device may obtain a current operating frequency of the edge computing node, and then may obtain maximum computing power resource information corresponding to the current operating frequency according to the current operating frequency. A target operating frequency of the edge computing node within the target time period is determined according to the maximum computing power resource information corresponding to the current operating frequency, the occupied computing power resource information, and the expected demand computing power resource information. Determining the target operating frequency of the edge computing node is determining whether the current operating frequency is to be increased or reduced, or to remain unchanged within the target time period. For ease of understanding, please refer to FIG. 4. FIG. 4 is a logic flowchart of adjusting an operating frequency of an edge computing node provided according to an embodiment of this application. As shown in FIG. 4, the logic flow may include at least the following steps S41 to S49:

Step S41: Determine whether the computing power of the edge computing node is fully loaded.

Specifically, the occupied computing power resource information of the edge computing node may be compared with the maximum computing power resource information corresponding to the current operating frequency. When the occupied computing power resource information is less than the maximum computing power resource information corresponding to the current operating frequency, and an absolute value of a difference between the occupied computing power resource information and the maximum computing power resource information corresponding to the current operating frequency is greater than a threshold (which may be manually set), it can be determined that the computing power of the edge computing node is not fully loaded, and there are redundant idle computing power resources. When the occupied computing power resource information is less than the maximum computing power resource information corresponding to the current operating frequency, but the absolute value of the difference between the occupied computing power resource information and the maximum computing power resource information corresponding to the current operating frequency is less than the threshold, it can be determined that the computing power of the edge computing node is in a full-load state, and there are no redundant idle computing power resources. Optically, when the occupied computing power resource information is equal to the maximum computing power resource information corresponding to the current operating frequency, it can be determined that the computing power of the edge computing node is in a full-load state, and there are no redundant idle computing power resources.

When it is determined that the computing power of the edge computing node is in a full-load state, subsequence step S42 is executed. When it is determined that the computing power of the edge computing node is not in a full-load state (i.e., a non-full-load state), subsequence step S45 is executed.

Step S42: Determine whether an expected computing power is increased.

Specifically, the occupied computing power resource information may be compared with the expected demand computing power resource information, so as to determine whether the expected demand computing power resource information is increased or reduced (or remains unchanged) with respect to the occupied computing power resource information. When the expected demand computing power resource information is increased, subsequent step S44 is executed. When the expected demand computing power resource information is not increased, subsequent step S43 is executed.

Step S43: Maintain the current operating frequency unchanged.

Specifically, when the computing power of the edge computing node is a full-load state, and the expected demand computing power resource information is not increased, it is indicated that the computing power resources provided by the edge computing node at the current operating frequency satisfy the expected demand computing power resources. In order to reduce the adjustment frequency of the operating frequency, and reduce loss caused by the adjustment, the operating frequency can be maintained unchanged. The unchanged current operating frequency is the target operating frequency within the target time period.

In some embodiments, the current operating frequency may also be appropriately reduced (e.g., reduced to the operating frequency corresponding to the expected demand computing power resources).

Step S44: Increase the operating frequency.

Specifically, when the computing power of the edge computing node is a full-load state, and the expected demand computing power resource information is increased, it is indicated that the computing power resources provided by the edge computing node at the current operating frequency cannot satisfy the expected demand computing power resources. The operating frequency may be appropriately increased (e.g., increased to the operating frequency corresponding to the expected demand computing power resources). The increased operating frequency is the target operating frequency within the target time period.

Step S45: Determine whether an expected computing power is increased.

Specifically, when it is determined that the computing power of the edge computing node is in a non-full-load state, the occupied computing power resource information may be compared with the expected demand computing power resource information, so as to determine whether the expected demand computing power resource information is increased or reduced (or remains unchanged) with respect to the occupied computing power resource information. When the expected demand computing power resource information is increased, subsequent step S46 is executed. When the expected demand computing power resource information is not increased, subsequent step S48 is executed.

Step S46: Determine whether idle computing power satisfies expected computing power.

Specifically, when it is determined that the computing power of the edge computing node is in a non-full-load state, and the expected demand computing power resource information is increased, the occupied computing power resource information may be subtracted from the maximum computing power resource information corresponding to the current operating frequency, so as to obtain idle computing power resource information of the edge computing node. Then, a resource sum of the first variable computing power resource information, the second variable computing power resource information, and the third variable computing power resource information is subjected to statistics collection, and the sum is demand computing power resources needing to be newly added by the edge computing node. The idle computing power resource information may be compared with the resource sum. When the idle computing power resource information is greater than the resource sum, it is determined that the idle computing power resource information may satisfy newly added demand computing power resources, and step S43 is executed (i.e., the current operating frequency is maintained unchanged). When the idle computing power resource information is less than the resource sum, it is determined that the idle computing power resource information cannot satisfy newly added demand computing power resources, and subsequent step S47 is executed. In some embodiments, when the idle computing power resource information is equal than the resource sum, it is determined that the idle computing power resource information may satisfy newly added demand computing power resources, and step S43 is executed.

Step S47: Increase the operating frequency.

Specifically, when the idle computing power resource information cannot satisfy newly added demand computing power resources, the operating frequency may be appropriately increased (e.g., increased to the operating frequency corresponding to the expected demand computing power resources within the target time period). The increased operating frequency is the target operating frequency within the target time period.

Step S48: Determine whether power consumption after frequency reduction changes.

Specifically, when it is determined that the computing power of the edge computing node is in a non-full-load state, and the expected demand computing power resource information is not increased, the maximum computing power resource information corresponding to the current operating frequency may satisfy the expected computing power resource information, and the operating frequency may be appropriately reduced. However, in this application, in order to reduce the adjustment frequency of the operating frequency (to avoid frequent adjustment of the operating frequency), and reduce the problem of unstable system operation caused by frequent frequency adjustment, before frequency reduction, whether power consumption of the edge computing node after frequency reduction changes (i.e., whether the power consumption is reduced) may be first determined, and when there is a change in power consumption, the operating frequency is reduced. When there is no change in power consumption, the frequency may be maintained unchanged. Although the operating frequency is not reduced, frequent adjustment of the operating frequency is avoided in the whole frequency adjustment process (which is not a situation in which when the frequency needs to be reduced, the operating frequency is necessarily reduced), thereby improving the stability of system operation, and also reducing operation costs.

However, because the reduction of the operating frequency and the reduction of power consumption are not in a linear relationship (which is not a situation in which the operating frequency is reduced, the power consumption is necessarily reduced). Due to a difference in hardware implementation, when the operating frequency is slightly reduced, the power consumption may not be reduced. Therefore, in order to accurately collect statistics about a relationship between frequencies and power consumption of hardware of different models, a corresponding relationship between the operating frequency and the power consumption can be continuously corrected according to historical data and a real-time operation condition, so that a relationship mapping table of the computing power, frequency and power consumption of the hardware (including the CPU and the GPU) can be obtained.

The relationship mapping table may be as shown in Table 1 below.

TABLE 1

| Field | Type | Description |
| --- | --- | --- |
| Model | String | Machine model |
| GPU model | String | GPU model |
| GPU operating frequency | int | GPU operating frequency (Hz) |
| GPU maximum computing power | list | Measurement through OPS and FLOPS |
| GPU power consumption | int | GPU power consumption (Watts) |
| CPU model | String | CPU model |
| CPU operating frequency | int | GPU operating frequency (Hz) |
| CPU maximum computing power | List | Measurement through OPS and FLOPS |
| CPU power consumption | int | CPU power consumption (Watts) |
| Machine overall power consumption | int | The unit of power is Watts. Different CPU and GPU operating frequencies will cause heat dissipation and operation of other components to be changed. In addition to changes in CPU and GPU power consumption, the power consumption of the overall unit will also be significantly affected. |

As shown in Table 1, the relationship mapping table may include a mapping relationship among the operating frequency of the CPU, the maximum computing power corresponding to the operating frequency, and the power consumption corresponding to the operating frequency. The relationship mapping table may also include a mapping relationship among the operating frequency of the GPU, the maximum computing power corresponding to the operating frequency, and the power consumption corresponding to the operating frequency. When the expected demand computing power resource information within the target time period is determined, the operating frequency corresponding to the expected demand computing power resource information may be obtained according to the relationship mapping table. When the computing power of the edge computing node is in a non-full-load state and the expected demand computing power resources are not increased, the operating frequency may be appropriately reduced, but before this, whether the power consumption is reduced when the frequency is reduced may be determined by means of the relationship mapping table. If compared with the power consumption corresponding to the current operating frequency, the power consumption corresponding to the expected demand computing power resource information after frequency reduction is not reduced, the operating frequency may not be reduced, and the operating frequency can be maintained unchanged. The current operating frequency is continued to be taken as the target operating frequency within the target time period.

If compared with the power consumption corresponding to the current operating frequency, the power consumption corresponding to the expected demand computing power resource information after frequency reduction is changed (e.g., reduced), the operating frequency may be reduced (e.g., through the relationship mapping table, the operating frequency is reduced to the operating frequency corresponding to the expected demand computing power resources). The reduced operating frequency may be taken as the target operating frequency within the target time period.

It is to be understood that, in this application, by determining whether there is a change in power consumption, the operating frequency of the edge computing node is dynamically adjusted, which may reduce a situation in which the operating frequency is frequently adjusted but no significant effect is realized, and can also improve the stability of system operation.

In the embodiments of this application, the main factors affecting the computing power resource change of the edge computing node include the factors that the object is online, gets offline, and gets online. Therefore, in this application, a newly added service object, an offline service object, and a scenario switching service object for the target application within a target time period may be predicted, and expected demand computing power resource information of the target application for the edge computing node within the target time period may be determined according to the newly added service object, the offline service object, and the scenario switching service object. Therefore, whether the current operating frequency is increased, reduced, or maintained unchanged within the target time period may be determined according to the expected demand computing power resource information of the target time period, the occupied computing power resource information of the edge computing node, and the maximum computing power resource information corresponding to the current operating frequency of the edge computing node (i.e., determining the target operating frequency within the target time period). The maximum computing power resource information of the edge computing node corresponds to the operating frequency of the edge computing node (e.g., the greater the operating frequency, the greater the maximum computing power resource information), and the operating frequency and the operating consumption (i.e., power consumption) of the edge computing node also have a corresponding relationship. Therefore, by adjusting the operating frequency of the edge computing node in a timely fashion (increased, reduced or maintained unchanged), the maximum computing power resource information corresponding to the target operating frequency within the target time period can satisfy the expected demand computing power resource information, so that the problem that the computing power resources provided by the edge computing node are not matched with actually required computing power resources can be reduced (e.g., the problem that the computing power resources provided by the edge computing node are excessively large but the actually required computing power resources are small is reduced), the computing power resources provided by the edge computing node are matched with the required computing power resources within the target time period, the operating consumption of the edge computing node cannot be excessively large, and the operation costs are reduced. That is, in this application, by adjusting the operating frequency of the edge computing node, the computing power resources provided by the edge computing node will not be much greater than the expected demand computing power resource information (i.e., reducing the operation costs), and the computing power resources will not be much less than the expected demand computing power resource information so that the demand cannot be satisfied, thereby dynamically balancing the computing power demand and the operation costs. That is, in this application, the operation costs of the edge computing node can be reduced while the computing power demand is satisfied.

Figure 5:
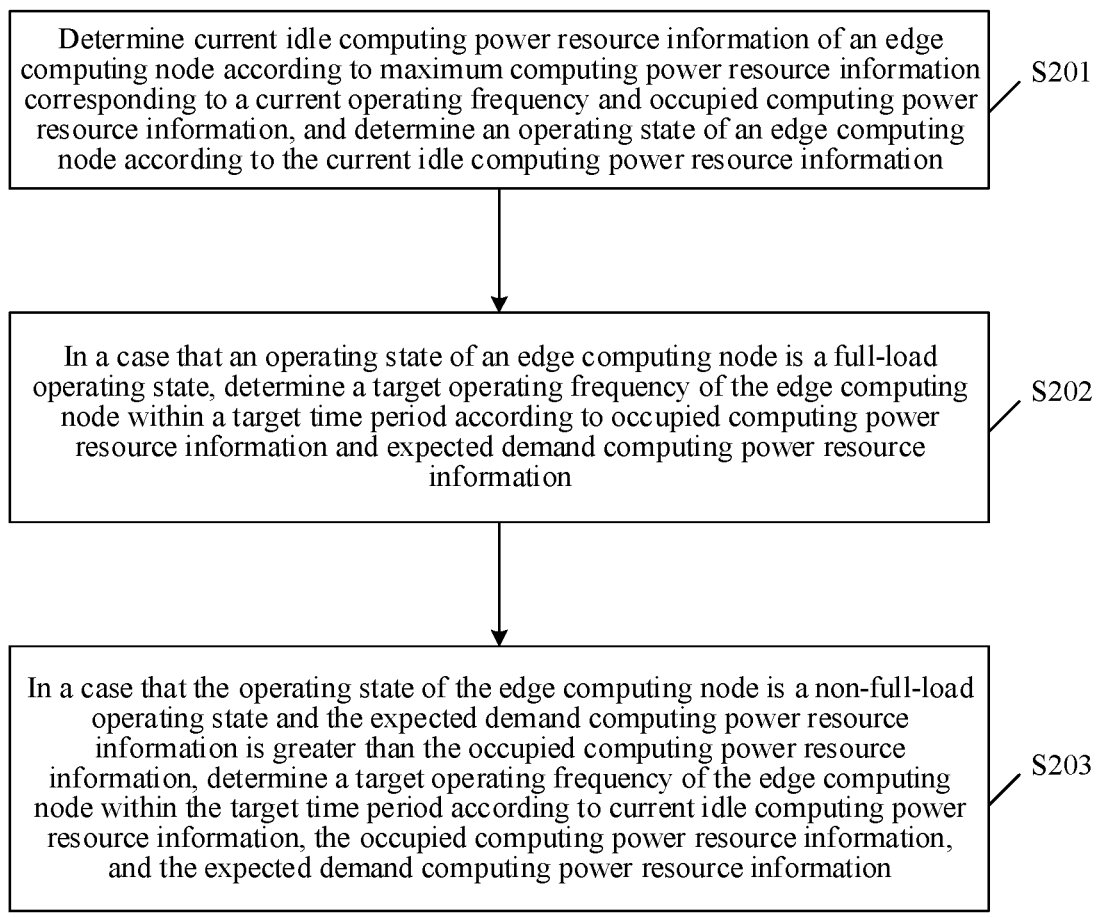
FIG. 5 is a schematic flowchart of determining a target operating frequency within a target time period provided according to an embodiment of this application.

Further, FIG. 5 is a schematic flowchart of determining a target operating frequency within a target time period provided according to an embodiment of this application. The flow may correspond to the embodiment corresponding to FIG. 3, and step S103 is the flow of determining the target operating frequency. As shown in FIG. 5, the flow may include the following steps S201 to S203:

Step S201: Determine current idle computing power resource information of an edge computing node according to maximum computing power resource information corresponding to a current operating frequency and occupied computing power resource information, and determine an operating state of the edge computing node according to the current idle computing power resource information.

The current idle computing power resource information is computing power resources of the edge computing node unoccupied by the target application during operation of the target application, i.e., unused computing power resource information of the edge computing node.

Specifically, the occupied computing power resource information may be subtracted from the maximum computing power resource information corresponding to the current operating frequency (e.g., the occupied computing power resource information is subtracted from the maximum computing power resource information corresponding to the current operating frequency), thereby obtaining the current idle computing power resource information of the edge computing node. The operating state of the edge computing node may be determined according to the current idle computing power resource information. The specific method includes: matching the current idle computing power resource information with an idle resource threshold; when the current idle computing power resource information is greater than the idle resource threshold, determining the operating state of the edge computing node as a non-full-load operating state; and when the current idle computing power resource information is less than the idle resource threshold, determining the operating state of the edge computing node as a full-load operating state. In some embodiments, when the current idle computing power resource information is equal to the idle resource threshold, the operating state of the edge computing node may also be determined as the non-full-load operating state. The idle resource threshold herein may correspond to the threshold in the embodiment corresponding to FIG. 4, and the non-full-load operating state may be understood as the computing power non-full-load state. The full-load operating state may be understood as the computing power full-load state. For the specific determination method, reference may be made to the descriptions for step S41 in the embodiment corresponding to FIG. 4, and details are not described herein again.

Step S202: When the operating state of the edge computing node is the full-load operating state, determine a target operating frequency of the edge computing node within a target time period according to the occupied computing power resource information and expected demand computing power resource information.

Specifically, when the operating state of the edge computing node is the full-load operating state, the expected demand computing power resource information is compared with the occupied computing power resource information. When the expected demand computing power resource information is greater than the occupied computing power resource information, a mapping table is obtained. The mapping table includes N mapping relationships. A mapping relationship includes a corresponding relationship between a configured operating frequency (the configured operating frequency may refer to an operating frequency in the mapping table) and configured maximum computing power resource information (in the mapping table, one operating frequency corresponds to one piece of maximum computing power resource information, the operating frequency in the mapping table may be referred as the configured operating frequency, and the maximum computing power resource information corresponding to each configured operating frequency may be referred as configured maximum computing power resource information). In the mapping table, a configured operating frequency corresponding to the configured maximum computing power resource information greater than the expected demand computing power resource information may be determined as the target operating frequency (in some embodiments, a configured operating frequency corresponding to the configured maximum computing power resource information equal to the expected demand computing power resource information may also be determined as the target operating frequency). Then, the operating frequency of the edge computing node is adjusted from the current operating frequency to the target operating frequency. Here, when the configured operating frequency corresponding to the configured maximum computing power resource information greater than the expected demand computing power resource information in the mapping table is determined as the target operating frequency, the configured maximum computing power resource information greater than the expected demand computing power resource information is slightly greater than the expected demand computing power resource information (e.g., the smallest one of the configured maximum computing power resource information greater than the expected demand computing power resource information in the mapping table), so that the computing power resources provided within the target time period can be prevented from being excessively large (i.e., the edge computing node is prevented from operating at an excessively large operating frequency within the target time period).

In some embodiments, it may be understood that, after the expected demand computing power resource information is compared with the occupied computing power resource information, when the expected demand computing power resource information is less than the occupied computing power resource information, the current operating frequency is determined as the target operating frequency. In some embodiments, after the expected demand computing power resource information is compared with the occupied computing power resource information, when the expected demand computing power resource information is equal to the occupied computing power resource information, the current operating frequency is determined as the target operating frequency.

Step S203: When the operating state of the edge computing node is the non-full-load operating state and the expected demand computing power resource information is greater than the occupied computing power resource information, determine a target operating frequency of the edge computing node within the target time period according to the current idle computing power resource information, the occupied computing power resource information, and the expected demand computing power resource information.

Specifically, when the operating state of the edge computing node is the non-full-load operating state and the expected demand computing power resource information is greater than the occupied computing power resource information, an absolute value of a resource difference between the expected demand computing power resource information and the occupied computing power resource information is determined. When the current idle computing power resource information is less than the absolute value of the resource difference, a mapping table is obtained. The mapping table includes N mapping relationships. A mapping relationship includes a corresponding relationship between a configured operating frequency and configured maximum computing power resource information. In the mapping table, a configured operating frequency corresponding to the configured maximum computing power resource information greater than (or equal to) the expected demand computing power resource information may be determined as the target operating frequency. The operating frequency of the edge computing node is adjusted from the current operating frequency to the target operating frequency. Here, when the configured operating frequency corresponding to the configured maximum computing power resource information greater than the expected demand computing power resource information in the mapping table is determined as the target operating frequency, the configured maximum computing power resource information greater than the expected demand computing power resource information is slightly greater than the expected demand computing power resource information (e.g., the smallest one of the configured maximum computing power resource information greater than the expected demand computing power resource information in the mapping table), so that the computing power resources provided within the target time period can be prevented from being excessively large.

In some embodiments, it may be understood that, after the absolute value of the resource difference between the expected demand computing power resource information and the occupied computing power resource information is determined, when the current idle computing power resource information is greater than or equal to the absolute value of the resource difference, the current operating frequency is determined as the target operating frequency.

In some embodiments, it may be understood that, when the operating state of the edge computing node is the non-full-load operating state and the expected demand computing power resource information is less than the occupied computing power resource information, a mapping table is obtained. The mapping table includes N mapping relationships. A mapping relationship includes a corresponding relationship between a configured operating frequency, configured maximum computing power resource information, and configured operating consumption (generally, the edge computing node, when operating at a certain frequency, generates power consumption (power loss (Watts)), different operating frequencies may generate different power consumption, the operating consumption herein may refer to power consumption, and the operating consumption corresponding to each configured operating frequency in the mapping table may be referred to as configured operating consumption). The configured operating consumption corresponding to the current operating frequency in the mapping table is determined as to-be-compared configured operating consumption, and a target operating frequency of the edge computing node within the target time period is determined according to the to-be-compared configured operating consumption.

The specific method for determining a target operating frequency of the edge computing node within the target time period according to the to-be-compared configured operating consumption includes: determining, in the mapping table, configured operating consumption corresponding to the configured maximum computing power resource information greater than or equal to the expected demand computing power resource information as target operating consumption; comparing the target operating consumption with the to-be-compared configured operating consumption; when the target operating consumption is less than the to-be-compared configured operating consumption, determining a configured operating frequency corresponding to the target operating consumption as the target operating frequency, and adjusting the operating frequency of the edge computing node from the current operating frequency to the target operating frequency; and when the target operating consumption is greater than or equal to the configured operating consumption, determining the current operating frequency as the target operating frequency. Here, when the configured operating frequency corresponding to the configured maximum computing power resource information greater than the expected demand computing power resource information in the mapping table is determined as the target operating frequency, the configured maximum computing power resource information greater than the expected demand computing power resource information is slightly greater than the expected demand computing power resource information (e.g., the smallest one of the configured maximum computing power resource information greater than the expected demand computing power resource information in the mapping table), so that the computing power resources provided within the target time period can be prevented from being excessively large (i.e., the operating frequency of the edge computing node within the target time period is prevented from being excessively large).

In some embodiments, when the operating state of the edge computing node is the non-full-load operating state and the expected demand computing power resource information is equal to the occupied computing power resource information, the current operating frequency is maintained unchanged (i.e., the current operating frequency is taken as the target operating frequency within the target time period).

The operating consumption may be understood as the power consumption of the edge computing node, and the mapping table may be understood as a relationship mapping table. For specific implementation of steps S201 to S203, reference may be made to the descriptions for steps S41 to S49 in the embodiment corresponding to FIG. 4, and details are not described herein again.

Figure 6:
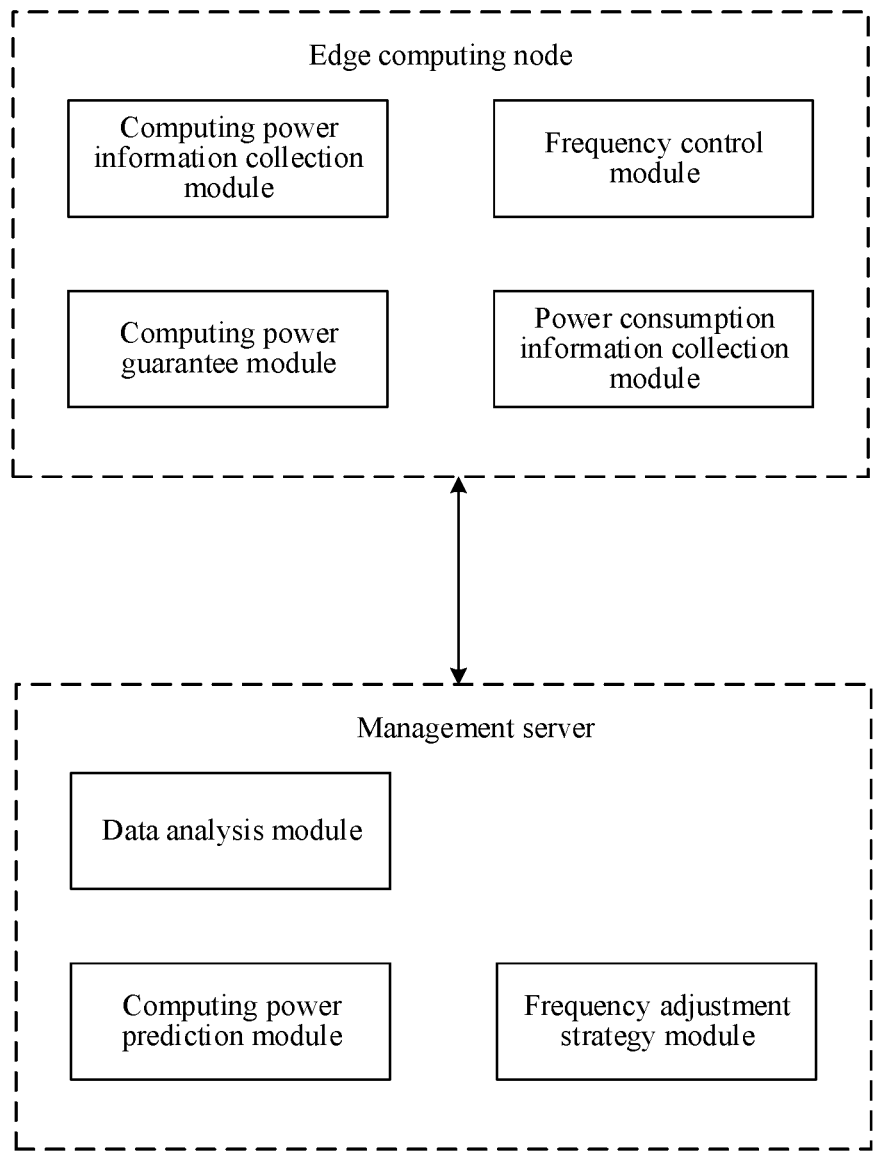
FIG. 6 is a diagram of a system architecture provided according to an embodiment of this application.

Further, FIG. 6 is a diagram of a system architecture provided according to an embodiment of this application. As shown in FIG. 6, the system may include a management server and an edge computing node, and the edge computing node may include a computing power information collection module, a frequency control module, a computing power guarantee module, and a power consumption information collection module. For ease of understanding, functions corresponding to the modules are described below.

The computing power information collection module: may mainly include CPU computing power information collection, GPU computing power information collection, and local unit information collection. The CPU computing power information collection mainly collects the CPU model, the current operating frequency, the maximum computing power that can be reached currently, the computing power currently actually used (i.e., the occupied computing power), the CPU power consumption, etc. The GPU computing power information collection mainly collects the GPU model, the current operating frequency, the maximum computing power that can be reached currently, the computing power currently actually used, and the GPU power consumption. The local unit information collection mainly collects the local unit model of the edge computing node and the current overall power consumption of the local unit.

The frequency control module: is mainly used for CPU frequency control and GPU frequency control. The CPU frequency control is mainly: to increase or reduce the operating frequency of the CPU according to requirements of the computing power guarantee module. The GPU frequency control is mainly: to increase or reduce the operating frequency of the GPU according to requirements of the computing power guarantee module.

The computing power guarantee module delivers CPU and GPU frequency adjustment instructions to the frequency control module according to an instruction of the management server and an actual computing power of the local unit. The computing power guarantee module is mainly used for frequency adjustment and basic computing power guarantee. The frequency adjustment is mainly: to increase or reduce the operating frequency of the CPU and GPU according to an instruction of the management server. When the operating frequency is needed to be increased, the adjustment may be directly performed. When the operating frequency is needed to be reduced, a change condition of the current CPU and GPU power consumption may be determined, and if the power consumption after frequency reduction is not reduced, the frequency reduction operation is not performed, and the corresponding information is notified to the management server. The basic computing power guarantee is mainly: to regularly check the current CPU and GPU load conditions, and if the current CPU and GPU have reached a full-load condition, the operating frequency is increased in real time.

The power consumption information collection module: is mainly used for CPU power consumption collection (collecting real-time power consumption of the CPU), GPU power consumption collection (collecting real-time power consumption of the GPU), overall unit power consumption collection (collecting real-time power consumption of the overall unit), and computing power data. After collection, the data is summarized and reported to the management server.

The management server may include a data analysis module, a computing power prediction module, and a frequency adjustment strategy module. For ease of understanding, functions corresponding to the modules are described below.

The data analysis module: is configured to receive a data report of the edge computing node, and perform preliminary analysis for use by other modules.

The computing power prediction module: is configured to predict a change condition of the next-stage computing power according to a newly entered user and a historical trend, i.e., predicting expected demand computing power resource information of the next stage.

The frequency adjustment strategy module: is configured to determine, according to a current computing power usage condition and the operating frequency of the CPU and the GPU, whether to increase or reduce the operating frequency of the CPU and the GPU.

Figure 7:
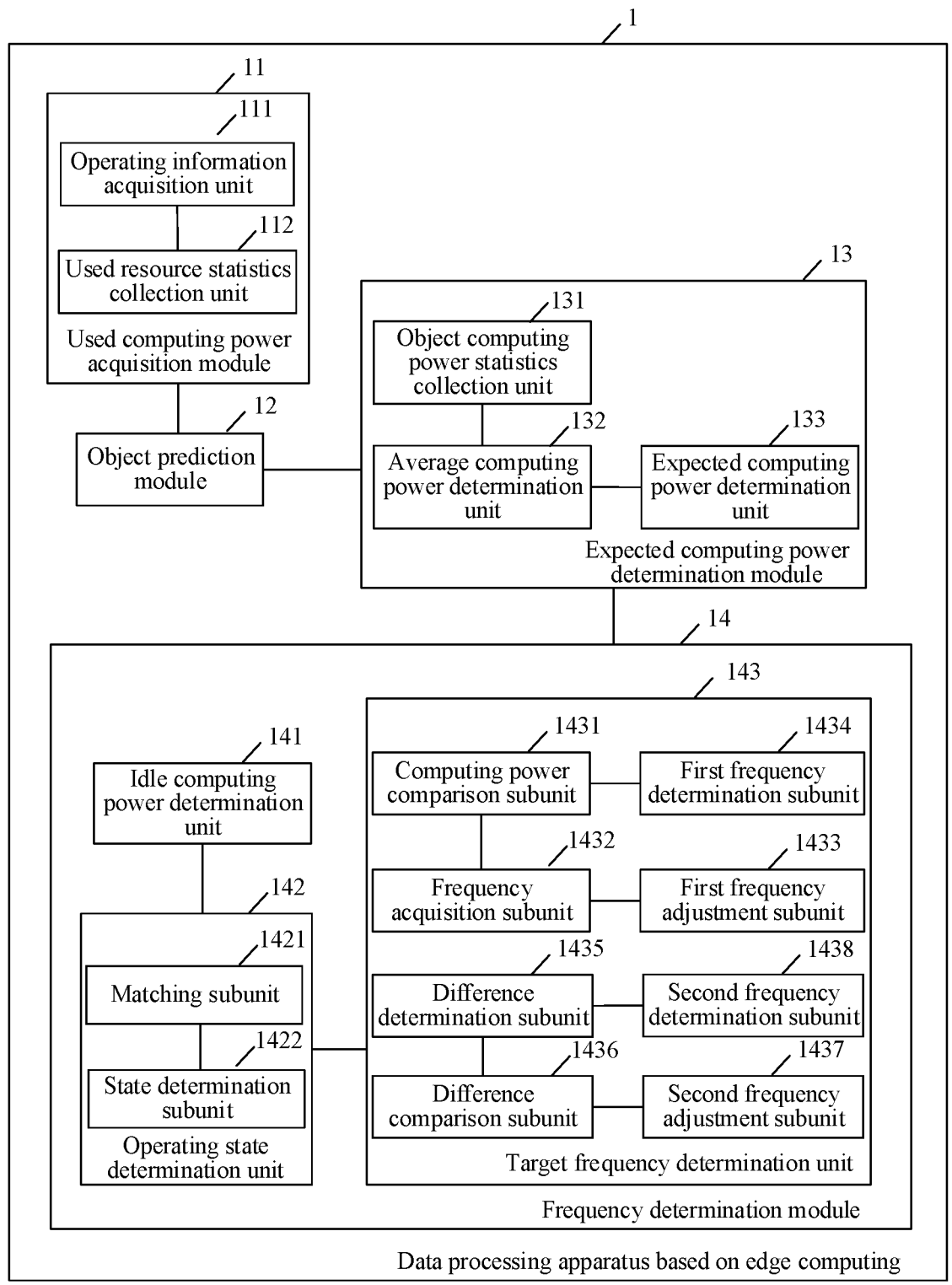
FIG. 7 is a schematic structural diagram of a data processing apparatus based on edge computing provided according to an embodiment of this application.

Further, FIG. 7 is a schematic structural diagram of a data processing apparatus based on edge computing provided according to an embodiment of this application. The data processing apparatus based on edge computing may be a computer-readable instruction (including program code) operating in a computer device, for example, the data processing apparatus based on edge computing is application software. The data processing apparatus based on edge computing may be configured to execute the method shown in FIG. 3. As shown in FIG. 7, the data processing apparatus 1 based on edge computing includes: a used computing power acquisition module 11, an object prediction module 12, an expected computing power determination module 13, and a frequency determination module 14.

The used computing power acquisition module 11 is configured to obtain occupied computing power resource information of a target application for an edge computing node. The occupied computing power resource information is computing power resource information of the edge computing node occupied during operation of the target application.

The object prediction module 12 is configured to predict a newly added service object, an offline service object, and a scenario switching service object for the target application within a target time period.

The expected computing power determination module 13 is configured to determine expected demand computing power resource information of the target application for the edge computing node within the target time period according to the newly added service object, the offline service object, and the scenario switching service object.

The frequency determination module 14 is configured to obtain a current operating frequency of the edge computing node.

The frequency determination module 14 is further configured to determine a target operating frequency of the edge computing node within the target time period according to maximum computing power resource information corresponding to the current operating frequency, the occupied computing power resource information, and the expected demand computing power resource information. The maximum computing power resource information corresponding to the target operating frequency satisfies the expected demand computing power resource information.

For the specific implementation of the used computing power acquisition module 11, the object prediction module 12, the expected computing power determination module 13, and the frequency determination module 14, reference may be made to the descriptions for step S101-S103 in the embodiment corresponding to FIG. 3, and details are not described herein again.

In an embodiment, the frequency determination module 14 includes: an idle computing power determination unit 141, an operating state determination unit 142, and a target frequency determination unit 143.

The idle computing power determination unit 141 is configured to determine current idle computing power resource information of the edge computing node according to the maximum computing power resource information corresponding to the current operating frequency and the occupied computing power resource information.

The operating state determination unit 142 is configured to determine an operating state of the edge computing node according to the current idle computing power resource information.

The target frequency determination unit 143 is configured to, when the operating state of the edge computing node is a full-load operating state, determine a target operating frequency of the edge computing node within the target time period according to the occupied computing power resource information and the expected demand computing power resource information.

The target frequency determination unit 143 is further configured to, when the operating state of the edge computing node is a non-full-load operating state and the expected demand computing power resource information is greater than the occupied computing power resource information, determine a target operating frequency of the edge computing node within the target time period according to the current idle computing power resource information, the occupied computing power resource information, and the expected demand computing power resource information.

For the specific implementation of the idle computing power determination unit 141, the operating state determination unit 142, and the target frequency determination unit 143, reference may be made to the descriptions for step S103 in the embodiment corresponding to FIG. 3, and details are not described herein again.

In an embodiment, the operating state determination unit 142 includes: a matching subunit 1421 and a state determination subunit 1422.

The matching subunit 1421 is configured to match the current idle computing power resource information with an idle resource threshold.

The state determination subunit 1422 is configured to, when the current idle computing power resource information is greater than the idle resource threshold, determine the operating state of the edge computing node as a non-full-load operating state.

The state determination subunit 1422 is further configured to, when the current idle computing power resource information is less than the idle resource threshold, determine the operating state of the edge computing node as a full-load operating state.

For the specific implementation of the matching subunit 1421 and the state determination subunit 1422, reference may be made to the descriptions for step S103 in the embodiment corresponding to FIG. 3, and details are not described herein again.

In an embodiment, the target frequency determination unit 143 includes: a computing power comparison subunit 1431, a frequency acquisition subunit 1432, and a first frequency adjustment subunit 1433.

The computing power comparison subunit 1431 is configured to, when the operating state of the edge computing node is the full-load operating state, compare the expected demand computing power resource information with the occupied computing power resource information.

The frequency acquisition subunit 1432 is configured to, when the expected demand computing power resource information is greater than the occupied computing power resource information, obtain a mapping table. The mapping table includes N mapping relationships. A mapping relationship includes a corresponding relationship between a configured operating frequency and configured maximum computing power resource information.

The frequency acquisition subunit 1432 is further configured to, determine, in the mapping table, a configured operating frequency corresponding to the configured maximum computing power resource information greater than the expected demand computing power resource information as the target operating frequency.

The first frequency adjustment subunit 1433 is configured to adjust the operating frequency of the edge computing node from the current operating frequency to the target operating frequency.

For the specific implementation of the computing power comparison subunit 1431, the frequency acquisition subunit 1432, and the first frequency adjustment subunit 1433, reference may be made to the descriptions for step S103 in the embodiment corresponding to FIG. 3, and details are not described herein again.

In an embodiment, the target frequency determination unit 143 further includes: a first frequency determination subunit 1434.

The first frequency determination subunit 1434 is configured to, when the expected demand computing power resource information is less than the occupied computing power resource information, determine the current operating frequency as the target operating frequency.

In an embodiment, the target frequency determination unit 143 includes: a difference determination subunit 1435, a difference comparison subunit 1436, and a second frequency adjustment subunit 1437.

The difference determination subunit 1435 is configured to, when the operating state of the edge computing node is the non-full-load operating state and the expected demand computing power resource information is greater than the occupied computing power resource information, determine an absolute value of a resource difference between the expected demand computing power resource information and the occupied computing power resource information.

The difference comparison subunit 1436 is configured to, when the current idle computing power resource information is less than the absolute value of the resource difference, obtain a mapping table. The mapping table includes N mapping relationships. A mapping relationship includes a corresponding relationship between a configured operating frequency and configured maximum computing power resource information.

The difference comparison subunit 1436 is further configured to, determine, in the mapping table, a configured operating frequency corresponding to the configured maximum computing power resource information greater than the expected demand computing power resource information as the target operating frequency.

The second frequency adjustment subunit 1437 is configured to adjust the operating frequency of the edge computing node from the current operating frequency to the target operating frequency.

For the specific implementation of the difference determination subunit 1435, the difference comparison subunit 1436, and the second frequency adjustment subunit 1437, reference may be made to the descriptions for step S103 in the embodiment corresponding to FIG. 3, and details are not described herein again.

In an embodiment, the target frequency determination unit 143 further includes: a second frequency determination subunit 1438.

The second frequency determination subunit 1438 is further configured to, when the current idle computing power resource information is greater than the absolute value of the resource difference, determine the current operating frequency as the target operating frequency.

In an embodiment, the frequency determination module 14 further includes: a table acquisition unit 144 and a consumption acquisition unit 145.

The table acquisition unit 144 is configured to, when the operating state of the edge computing node is the non-full-load operating state and the expected demand computing power resource information is less than the occupied computing power resource information, obtain a mapping table. The mapping table includes N mapping relationships. A mapping relationship includes a corresponding relationship between a configured operating frequency, configured maximum computing power resource information, and configured operating consumption.

The consumption acquisition unit 145 is configured to determine configured operating consumption corresponding to the current operating frequency in the mapping table as to-be-compared configured operating consumption.

The consumption acquisition unit 145 is further configured to determine a target operating frequency of the edge computing node within the target time period according to the to-be-compared configured operating consumption.

For the specific implementation of the table acquisition unit 144 and the consumption acquisition unit 145, reference may be made to the descriptions for step S103 in the embodiment corresponding to FIG. 3, and details are not described herein again.

In an embodiment, the consumption acquisition unit 145 is further specifically configured to, determine, in the mapping table, configured operating consumption corresponding to the configured maximum computing power resource information greater than the expected demand computing power resource information as target operating consumption.

The consumption acquisition unit 145 is further specifically configured to compare the target operating consumption with the to-be-compared configured operating consumption.

The consumption acquisition unit 145 is further specifically configured to, when the target operating consumption is less than the to-be-compared configured operating consumption, determine a configured operating frequency corresponding to the target operating consumption as the target operating frequency, and adjust the operating frequency of the edge computing node from the current operating frequency to the target operating frequency.

The consumption acquisition unit 145 is further specifically configured to, when the target operating consumption is greater than the configured operating consumption, determine the current operating frequency as the target operating frequency.

In an embodiment, the used computing power acquisition module 11 includes: an operating information acquisition unit 111 and a used resource statistics collection unit 112.

The operating information acquisition unit 111 is configured to obtain N pieces of current operating information of the target application. One piece of current operating information includes an application activity scenario where an online service object is located, and service object occupied resource information in the application activity scenario.

The used resource statistics collection unit 112 is configured to obtain service object occupied resource information corresponding to each piece of current operating information, to obtain N pieces of service object occupied resource information.

The used resource statistics collection unit 112 is further configured to determine a sum of the N pieces of service object occupied resource information as the occupied computing power resource information of the target application for the edge computing node.

For the specific implementation of the operating information acquisition unit 111 and the used resource statistics collection unit 112, reference may be made to the descriptions for step S101 in the embodiment corresponding to FIG. 3, and details are not described herein again.

In an embodiment, the N pieces of current operating information include one or more application activity scenarios. The one or more application activity scenarios include an application activity scenario $M_i$. i is a positive integer.

The expected computing power determination module 13 includes: an object computing power statistics collection unit 131, an average computing power determination unit 132, and an expected computing power determination unit 133.

The object computing power statistics collection unit 131 is configured to determine, from N online service objects, an online service object, of which an application activity scenario is an application activity scenario $M_i$, as a service object to be subjected to statistics collection.

The object computing power statistics collection unit 131 is further configured to collect statistics about total service object occupied resource information of the service object to be subjected to statistics collection in the application activity scenario $M_i$.

The average computing power determination unit 132 is configured to obtain an object quantity corresponding to the service object to be subjected to statistics collection, and determine, according the total service object occupied resource information and the object quantity, average computing power demand information corresponding to the application activity scenario $M_i$.

The expected computing power determination unit 133 is configured to, in response to determining average computing power demand information respectively corresponding to the one or more application activity scenarios, determine expected demand computing power resource information of the target application for the edge computing node within the target time period according to the average computing power demand information respectively corresponding to the one or more application activity scenarios, the newly added service object, the offline service object, and the scenario switching service object.

For the specific implementation of the object computing power statistics collection unit 131, the average computing power determination unit 132, and the expected computing power determination unit 133, reference may be made to the descriptions for step S102 in the embodiment corresponding to FIG. 3, and details are not described herein again.

In an embodiment, the expected computing power determination unit 133 is further specifically configured to obtain a newly added quantity corresponding to the newly added service object, an offline quantity corresponding to the offline service object, and a switching quantity corresponding to the scenario switching object.

The expected computing power determination unit 133 is further specifically configured to predict an initial login scenario corresponding to the newly added service object. The one or more application activity scenarios include the initial login scenario.

The expected computing power determination unit 133 is further specifically configured to determine an application activity scenario where the offline service object having an offline behavior is located as an offline application activity scenario.

The expected computing power determination unit 133 is further specifically configured to determine an application activity scenario where the scenario switching object is located before scenario switching as an initial application activity scenario, and an application activity scenario where the scenario switching object is located after scenario switching as a target application activity scenario.

The expected computing power determination unit 133 is further specifically configured to determine expected demand computing power resource information of the target application for the edge computing node within the target time period according to the average computing power demand information respectively corresponding to the initial login scenario, the offline application activity scenario, the initial application activity scenario, and the target application activity scenario, as well as the switching quantity, the offline quantity, and the newly added quantity.

In an embodiment, the expected computing power determination unit 133 is further specifically configured to determine first variable computing power resource information corresponding to the newly added service object according to the newly added quantity and the average computing power demand information corresponding to the initial login scenario.

The expected computing power determination unit 133 is further specifically configured to determine second variable computing power resource information corresponding to the offline service object according to the offline quantity and the average computing power demand information corresponding to the online application activity scenario.

The expected computing power determination unit 133 is further specifically configured to determine third variable computing power resource information corresponding to the scenario switching object according to the average computing power demand information corresponding to the initial application activity scenario, the average computing power demand information corresponding to the target application activity scenario, and the switching quantity.

The expected computing power determination unit 133 is further specifically configured to determine expected demand computing power resource information of the target application for the edge computing node within the target time period according to the first variable computing power resource information, the second variable computing power resource information, the third variable computing power resource information, and the occupied computing power resource information of the edge computing node.

In the embodiments of this application, the main factors affecting the computing power resource change of the edge computing node include the factors that the object is online, gets offline, and gets online. Therefore, in this application, a newly added service object, an offline service object, and a scenario switching service object for the target application within a target time period may be predicted, and expected demand computing power resource information of the target application for the edge computing node within the target time period may be determined according to the newly added service object, the offline service object, and the scenario switching service object. Therefore, whether the current operating frequency is increased, reduced, or maintained unchanged within the target time period may be determined according to the expected demand computing power resource information of the target time period, the occupied computing power resource information of the edge computing node, and the maximum computing power resource information corresponding to the current operating frequency of the edge computing node (i.e., determining the target operating frequency within the target time period). The maximum computing power resource information of the edge computing node corresponds to the operating frequency of the edge computing node (e.g., the greater the operating frequency, the greater the maximum computing power resource information), and the operating frequency and the operating consumption (i.e., power consumption) of the edge computing node also have a corresponding relationship. Therefore, by adjusting the operating frequency of the edge computing node in a timely fashion (increased, reduced or maintained unchanged), the maximum computing power resource information corresponding to the target operating frequency within the target time period can satisfy the expected demand computing power resource information, so that the problem that the computing power resources provided by the edge computing node are not matched with actually required computing power resources can be reduced (e.g., the problem that the computing power resources provided by the edge computing node are excessively large but the actually required computing power resources are small is reduced), the computing power resources provided by the edge computing node are matched with the required computing power resources within the target time period, the operating consumption of the edge computing node cannot be excessively large, and the operation costs are reduced. That is, in this application, by adjusting the operating frequency of the edge computing node, the computing power resources provided by the edge computing node will not be much greater than the expected demand computing power resource information (i.e., reducing the operation costs), and the computing power resources will not be much less than the expected demand computing power resource information so that the demand cannot be satisfied, thereby dynamically balancing the computing power demand and the operation costs. That is, in this application, the operation costs of the edge computing node can be reduced while the computing power demand is satisfied.

Figure 8:
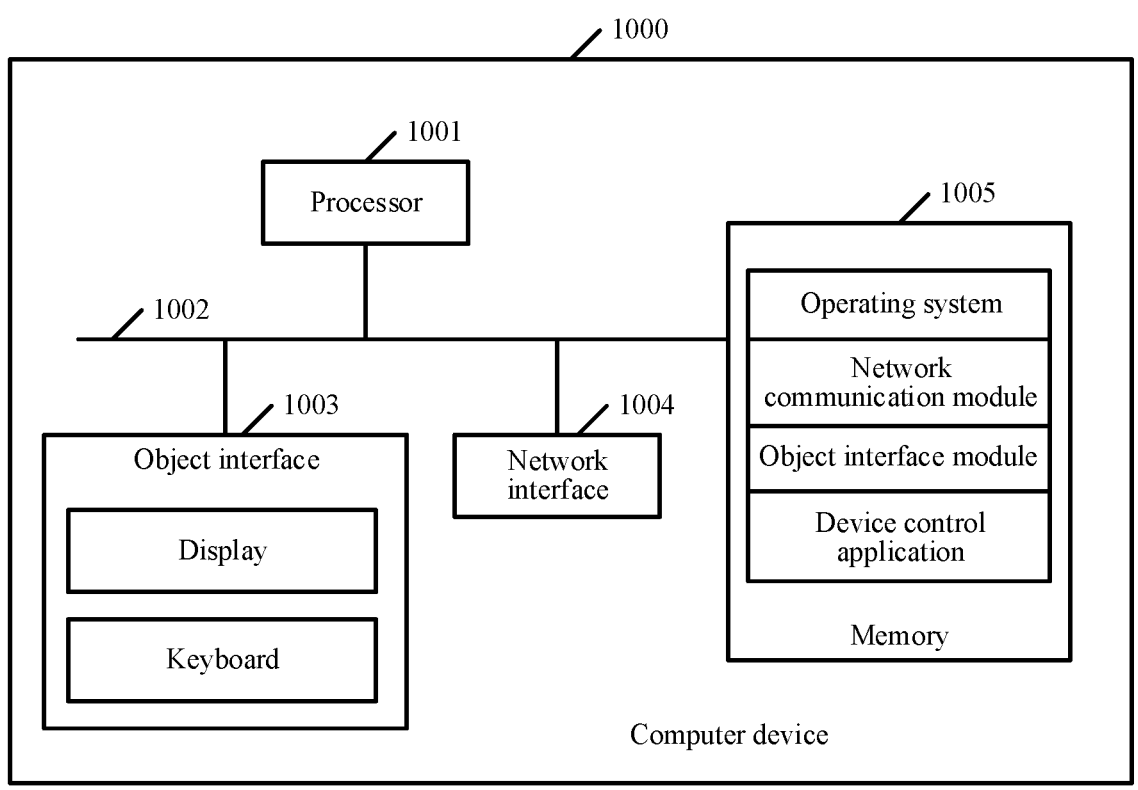
FIG. 8 is a schematic structural diagram of a computer device provided according to an embodiment of this application.

Further, FIG. 8 is a schematic structural diagram of a computer device provided according to an embodiment of this application. As shown in FIG. 8, the apparatus 1 in the embodiment corresponding to FIG. 7 may be applied to the computer device 1000, and the computer device 1000 includes: a processor 1001, a network interface 1004, and a memory 1005. In addition, the computer device 1000 further includes: an object interface 1003, and at least one communication bus 1002. The communication bus 1002 is configured to implement connection and communication between these components. The object interface 1003 includes a display and a keyboard. In some embodiments, the object interface 1003 further includes a standard wired interface and wireless interface. The network interface 1004 includes a standard wired interface and wireless interface (e.g., a WiFi interface). The memory 1005 may be a high-speed RAM memory, or may be a non-transitory computer-readable memory, for example, at least one magnetic disk memory. In some embodiments, the memory 1005 may further be at least one storage apparatus that is located far away from the processor 1001. As shown in FIG. 8, the memory 1005 as a computer-readable storage medium includes an operating system, a network communication module, an object interface module, and a device control application program.

In the computer device 1000 shown in FIG. 8, the network interface 1004 may provide a network communication function. The object interface 1003 is mainly configured to provide an input interface for an object. The processor 1001 may be configured to invoke the device control application program stored in the memory 1005, to perform the following operations: obtaining occupied computing power resource information of a target application for an edge computing node, the occupied computing power resource information being computing power resource information of the edge computing node occupied during operation of the target application; predicting a newly added service object, an offline service object, and a scenario switching service object for the target application within a target time period, and determining expected demand computing power resource information of the target application for the edge computing node within the target time period according to the newly added service object, the offline service object, and the scenario switching service object; and obtaining a current operating frequency of the edge computing node, and determining a target operating frequency of the edge computing node within the target time period according to maximum computing power resource information corresponding to the current operating frequency, the occupied computing power resource information, and the expected demand computing power resource information, the maximum computing power resource information corresponding to the target operating frequency satisfying the expected demand computing power resource information.

It is to be understood that, the computer device 1000 described in the embodiments of this application may perform the descriptions for the data processing method based on edge computing in the embodiments corresponding to FIGS. 3 to 5, and may also perform the descriptions for the data processing apparatus 1 based on edge computing in the embodiment corresponding to FIG. 7, and details are not described herein again. In addition, the descriptions of beneficial effects of the same method are not described herein again.

The embodiments of this application further provide a non-transitory computer-readable storage medium. The computer-readable storage medium stores computer-readable instructions which are performed by the computer device 1000 for data processing mentioned above. When the processor executes the computer-readable instructions, the processor can perform the descriptions for the data processing method in the embodiments corresponding to FIGS. 3 to 5. Therefore, details are not described herein again. In addition, the descriptions of beneficial effects of the same method are not described herein again. For technical details that are not disclosed in the computer-readable storage medium embodiments of this application, please refer to the descriptions of the method embodiments of this application.

The computer-readable storage medium may be a data processing apparatus based on edge computing or an internal storage unit of the computer device provided according to any embodiment above, such as a hard disk or an internal memory of the computer device. The computer-readable storage medium may also be an external storage device of the computer device, such as an insertion-type hard disk drive, a smart media card (SMC), a secure digital (SD) card, and a flash card, which are provided on the computer device. Further, the computer-readable storage medium may further include both an internal storage unit and an external storage device of the computer device. The computer-readable storage medium is configured to store the computer-readable instructions and other programs and data required by the computer device. The computer-readable storage medium can further be configured to temporarily store outputted data or data to be outputted.

According to one aspect of this application, a computer program product or a computer program is provided. The computer program product or computer program includes computer-readable instructions, the computer-readable instructions being stored in the computer-readable storage medium. A processor of the computer device reads the computer-readable instructions from the computer-readable storage medium, and the processor executes the computer-readable instructions to cause the computer device to perform the method provided according to one aspect of the embodiments of this application.

The terms such as "first" and "second" in the description, claims, and the accompanying drawings of this application are used to distinguish different objects and are not used to describe a specific sequence. In addition, the term "include" and any variant thereof are intended to cover a non-exclusive inclusion. For example, a process, method, apparatus, product, or device that includes a series of steps or units is not limited to the listed steps or units; and instead, further includes a step or unit that is not listed, or further includes another step or unit that is intrinsic to the process, method, apparatus, product, or device. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units.

A person skilled in the art may understand that, units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on functions. Whether the functions are executed in a mode of hardware or software depends on particular applications and design constraint conditions of the technical solutions. A person skilled in the art may use different methods to implement the described functions for each particular application, but it is not be considered that the implementation goes beyond the scope of this application.

The method and the related apparatus provided in the embodiments of this application are described with reference to the flowchart and/or schematic structural diagram of the method provided in the embodiments of this application, and specifically, each process and/or block of the flowchart and/or schematic structural diagram of the method and/or a combination of the processes and/or blocks in the flowchart and/or the block diagram can be implemented by the computer program instructions. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the schematic structural diagrams. These computer program instructions may also be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A method for allocating edge computing resources performed by at least one computer device, the method comprising:
   obtaining computing power resource information occupied by a target application at an edge computing node and a current operating frequency of the edge computing node during operation of the target application;
   obtaining historical service behavior data of the target application and operational activity information of the target application within a target time period;
   determining a number of newly added service objects of the edge computing node for the target application within the target time period according to the operational activity information within the target time period and the historical service behavior data;
   determining a number of offline service objects and scenario switching service objects of the edge computing node for the target application within the target time period according to the application activity scenario where the service object is located, the operational activity information within the target time period, and the historical service behavior data;
   determining expected demand computing power resource information of the target application for the edge computing node within the target time period according to the number of newly added service objects, offline service objects, and scenario switching service objects during the target time period; and
   determining a target operating frequency of the edge computing node within the target time period according to the current operating frequency, the occupied computing power resource information, and the expected demand computing power resource information.

2. The method according to claim 1, wherein the determining a target operating frequency of the edge computing node within the target time period according to the current operating frequency, the occupied computing power resource information, and the expected demand computing power resource information comprises:
   determining an operating state of the edge computing node according to the current operating frequency and the occupied computing power resource information;
   when the operating state of the edge computing node is a full-load operating state, determining a target operating frequency of the edge computing node within the target time period according to the occupied computing power resource information and the expected demand computing power resource information; and
   when the operating state of the edge computing node is a non-full-load operating state and the expected demand computing power resource information is greater than the occupied computing power resource information, determining a target operating frequency of the edge computing node within the target time period according to the current idle computing power resource information, the occupied computing power resource information, and the expected demand computing power resource information.

3. The method according to claim 2, wherein the determining an operating state of the edge computing node according to the current operating frequency and the occupied computing power resource information comprises:
   determining current idle computing power resource information of the edge computing node according to the current operating frequency and the occupied computing power resource information;
   matching the current idle computing power resource information with an idle resource threshold;
   when the current idle computing power resource information is greater than the idle resource threshold, determining the operating state of the edge computing node as the non-full-load operating state; and
   when the current idle computing power resource information is less than the idle resource threshold, determining the operating state of the edge computing node as the full-load operating state.

4. The method according to claim 2, wherein the determining a target operating frequency of the edge computing node within the target time period according to the occupied computing power resource information and the expected demand computing power resource information comprises:
   when the expected demand computing power resource information is greater than the occupied computing power resource information, obtaining a mapping table including N mapping relationships, each mapping relationship comprising a corresponding relationship between a configured operating frequency and configured maximum computing power resource information;
   determining, in the mapping table, a configured operating frequency corresponding to a configured maximum computing power resource information greater than the expected demand computing power resource information as the target operating frequency; and
   adjusting the operating frequency of the edge computing node from the current operating frequency to the target operating frequency.

5. The method according to claim 4, wherein the method further comprises:
   when the expected demand computing power resource information is less than the occupied computing power resource information, determining the current operating frequency as the target operating frequency.

6. The method according to claim 2, wherein the determining a target operating frequency of the edge computing node within the target time period according to the current idle computing power resource information, the occupied computing power resource information, and the expected demand computing power resource information comprises:
   when the expected demand computing power resource information is greater than the occupied computing power resource information, determining an absolute value of a resource difference between the expected demand computing power resource information and the occupied computing power resource information;
   when the current idle computing power resource information is less than the absolute value of the resource difference, obtaining a mapping table including N mapping relationships, each mapping relationship comprising a corresponding relationship between a configured operating frequency and configured maximum computing power resource information;
   determining, in the mapping table, a configured operating frequency corresponding to the configured maximum computing power resource information greater than the expected demand computing power resource information as the target operating frequency; and adjusting the operating frequency of the edge computing node from the current operating frequency to the target operating frequency.

7. The method according to claim 6, wherein the method further comprises:
when the current idle computing power resource information is greater than the absolute value of the resource difference, determining the current operating frequency as the target operating frequency.

8. The method according to claim 2, wherein the method further comprises:
when the operating state of the edge computing node is a non-full-load operating state and the expected demand computing power resource information is less than the occupied computing power resource information, obtaining a mapping table including N mapping relationships, each mapping relationship comprising a corresponding relationship between a configured operating frequency, configured maximum computing power resource information, and configured operating consumption;
determining configured operating consumption corresponding to the current operating frequency in the mapping table as to-be-compared configured operating consumption; and
determining a target operating frequency of the edge computing node within the target time period according to the to-be-compared configured operating consumption.

9. The method according to claim 8, wherein the determining a target operating frequency of the edge computing node within the target time period according to the to-be-compared configured operating consumption comprises:
determining, in the mapping table, configured operating consumption corresponding to configured maximum computing power resource information greater than the expected demand computing power resource information as target operating consumption; and
comparing the target operating consumption with the to-be-compared configured operating consumption; and
when the target operating consumption is less than the to-be-compared configured operating consumption, determining a configured operating frequency corresponding to the target operating consumption as the target operating frequency, and adjusting the operating frequency of the edge computing node from the current operating frequency to the target operating frequency.

10. The method according to claim 9, wherein the method further comprises:
when the target operating consumption is greater than the configured operating consumption, determining the current operating frequency as the target operating frequency.

11. The method according to claim 1, wherein, the obtaining computing power resource information occupied by a target application at an edge computing node and a current operating frequency of the edge computing node during operation of the target application comprises:
obtaining N pieces of current operating information of the target application, one piece of current operating information comprising an application activity scenario where an online service object is located, and service object occupied resource information in the application activity scenario;
obtaining service object occupied resource information corresponding to each piece of current operating information, to obtain N pieces of service object occupied resource information; and
determining a sum of the N pieces of service object occupied resource information as the occupied computing power resource information of the target application for the edge computing node.

12. The method according to claim 11, wherein the N pieces of current operating information comprise one or more application activity scenarios; the one or more application activity scenarios comprise an application activity scenario Mi; i is a positive integer; and
the determining expected demand computing power resource information of the target application for the edge computing node within the target time period according to the newly added service object, the offline service object, and the scenario switching service object comprises:
determining, from N online service objects, an online service object, of which an application activity scenario is an application activity scenario Mi, as a service object to be subjected to statistics collection;
collecting statistics about total service object occupied resource information of the service object to be subjected to statistics collection in the application activity scenario Mi;
obtaining an object quantity corresponding to the service object to be subjected to statistics collection, and determining, according to the total service object occupied resource information and the object quantity, average computing power demand information corresponding to the application activity scenario Mi; and
in response to determining average computing power demand information respectively corresponding to the one or more application activity scenarios, determining expected demand computing power resource information of the target application for the edge computing node within the target time period according to the average computing power demand information respectively corresponding to the one or more application activity scenarios, the newly added service object, the offline service object, and the scenario switching service object.

13. The method according to claim 12, wherein the determining expected demand computing power resource information of the target application for the edge computing node within the target time period according to the average computing power demand information respectively corresponding to the one or more application activity scenarios, the newly added service object, the offline service object, and the scenario switching service object comprises:
obtaining a newly added quantity corresponding to the newly added service object, an offline quantity corresponding to the offline service object, and a switching quantity corresponding to the scenario switching object;
predicting an initial login scenario corresponding to the newly added service object; the one or more application activity scenarios comprising the initial login scenario;
determining an application activity scenario where the offline service object having an offline behavior is located as an offline application activity scenario;
determining an application activity scenario where the scenario switching object is located before scenario switching as an initial application activity scenario, and determining an application activity scenario where the scenario switching object is located after scenario switching as a target application activity scenario; and determining expected demand computing power resource information of the target application for the edge computing node within the target time period according to the average computing power demand information respectively corresponding to the initial login scenario, the offline application activity scenario, the initial application activity scenario, and the target application activity scenario, as well as the switching quantity, the offline quantity, and the newly added quantity.

14. The method according to claim 11, wherein the determining expected demand computing power resource information of the target application for the edge computing node within the target time period according to the average computing power demand information respectively corresponding to the initial login scenario, the offline application activity scenario, the initial application activity scenario, and the target application activity scenario, as well as the switching quantity, the offline quantity, and the newly added quantity comprises:

determining first variable computing power resource information corresponding to the newly added service object according to the newly added quantity and the average computing power demand information corresponding to the initial login scenario;

determining second variable computing power resource information corresponding to the offline service object according to the offline quantity and the average computing power demand information corresponding to the online application activity scenario;

determining third variable computing power resource information corresponding to the scenario switching object according to the average computing power demand information corresponding to the initial application activity scenario, the average computing power demand information corresponding to the target application activity scenario, and the switching quantity; and determining expected demand computing power resource information of the target application for the edge computing node within the target time period according to the first variable computing power resource information, the second variable computing power resource information, the third variable computing power resource information, and the occupied computing power resource information of the edge computing node.

15. The method according to claim 14, wherein the determining expected demand computing power resource information of the target application for the edge computing node within the target time period according to the first variable computing power resource information, the second variable computing power resource information, the third variable computing power resource information, and the occupied computing power resource information of the edge computing node comprises:

adding the occupied computing power resource information, the first variable computing power resource information, and the third variable computing power resource information to obtain an added result; and subtracting the second variable computing power resource information from the added result to obtain expected demand computing power resource information of the target application for the edge computing node within the target time period.

16. A computer device, comprising: a processor, a memory, and a network interface, the processor being connected to the memory and the network interface, the network interface being configured to provide a network communication function, the memory being configured to store computer-readable instructions, and the computer-readable instructions, when executed by the processor, causing the computer device to perform a method for allocating edge computing resources performed by a computer device, the method comprising:

obtaining computing power resource information occupied by a target application at an edge computing node and a current operating frequency of the edge computing node during operation of the target application;

obtaining historical service behavior data of the target application and operational activity information of the target application within a target time period;

determining a number of newly added service objects of the edge computing node for the target application within the target time period according to the operational activity information within the target time period and the historical service behavior data;

determining a number of offline service objects and scenario switching service objects of the edge computing node for the target application within the target time period according to the application activity scenario where the service object is located, the operational activity information within the target time period, and the historical service behavior data;

determining expected demand computing power resource information of the target application for the edge computing node within the target time period according to the number of newly added service objects, offline service objects, and scenario switching service objects during the target time period; and determining a target operating frequency of the edge computing node within the target time period according to the current operating frequency, the occupied computing power resource information, and the expected demand computing power resource information.

17. The computer device according to claim 16, wherein the determining a target operating frequency of the edge computing node within the target time period according to the current operating frequency, the occupied computing power resource information, and the expected demand computing power resource information comprises:

determining an operating state of the edge computing node according to the current operating frequency and the occupied computing power resource information;

when the operating state of the edge computing node is a full-load operating state, determining a target operating frequency of the edge computing node within the target time period according to the occupied computing power resource information and the expected demand computing power resource information; and when the operating state of the edge computing node is a non-full-load operating state and the expected demand computing power resource information is greater than the occupied computing power resource information, determining a target operating frequency of the edge computing node within the target time period according to the current idle computing power resource information, the occupied computing power resource information, and the expected demand computing power resource information.

18. A non-transitory computer-readable storage medium, storing computer-readable instructions, and the computer-readable instructions, when executed by a processor of a computer device, causing the computer device to perform a method for allocating edge computing resources performed by a computer device, the method comprising:
- obtaining computing power resource information occupied by a target application at an edge computing node and a current operating frequency of the edge computing node during operation of the target application;
- obtaining historical service behavior data of the target application and operational activity information of the target application within a target time period;
- determining a number of newly added service objects of the edge computing node for the target application within the target time period according to the operational activity information within the target time period and the historical service behavior data;
- determining a number of offline service objects and scenario switching service objects of the edge computing node for the target application within the target time period according to the application activity scenario where the service object is located, the operational activity information within the target time period, and the historical service behavior data;
- determining expected demand computing power resource information of the target application for the edge computing node within the target time period according to the number of newly added service objects, offline service objects, and scenario switching service objects during the target time period; and
- determining a target operating frequency of the edge computing node within the target time period according to the current operating frequency, the occupied computing power resource information, and the expected demand computing power resource information.

19. The non-transitory computer-readable storage medium according to claim 18, wherein the determining a target operating frequency of the edge computing node within the target time period according to the current operating frequency, the occupied computing power resource information, and the expected demand computing power resource information comprises:
- determining an operating state of the edge computing node according to the current operating frequency and the occupied computing power resource information;
- when the operating state of the edge computing node is a full-load operating state, determining a target operating frequency of the edge computing node within the target time period according to the occupied computing power resource information and the expected demand computing power resource information; and
- when the operating state of the edge computing node is a non-full-load operating state and the expected demand computing power resource information is greater than the occupied computing power resource information, determining a target operating frequency of the edge computing node within the target time period according to the current idle computing power resource information, the occupied computing power resource information, and the expected demand computing power resource information.

* * * * *